US009848216B2

(12) United States Patent
Del Strother et al.

(10) Patent No.: US 9,848,216 B2
(45) Date of Patent: Dec. 19, 2017

(54) SECURITY AND/OR TRACING VIDEO MEDIA-CONTENT

(71) Applicant: Friend for Media Limited, Birmingham (GB)

(72) Inventors: William Del Strother, Birmingham (GB); Richard William Adams, Birmingham (GB); Kirsty Louise Stroud, Birmingham (GB); Jonathan Norman Friend, Birmingham (GB)

(73) Assignee: Friend for Media Limited, Birmingham (GB)

( * ) Notice: Subject to any disclaimer, the term of this patent is extended or adjusted under 35 U.S.C. 154(b) by 0 days.

(21) Appl. No.: 15/316,319

(22) PCT Filed: Jun. 5, 2015

(86) PCT No.: PCT/GB2015/051653
§ 371 (c)(1),
(2) Date: Dec. 5, 2016

(87) PCT Pub. No.: WO2015/185944
PCT Pub. Date: Dec. 10, 2015

(65) Prior Publication Data
US 2017/0155933 A1  Jun. 1, 2017

(30) Foreign Application Priority Data

Jun. 5, 2014  (GB) .................................. 1410032.5
Nov. 7, 2014  (WO) ................ PCT/GB2014/053329
Mar. 9, 2015  (GB) .................................. 1503954.8

(51) Int. Cl.
*H04N 7/173*  (2011.01)
*H04N 21/234*  (2011.01)
(Continued)

(52) U.S. Cl.
CPC ....... *H04N 21/23418* (2013.01); *G06F 21/16* (2013.01); *H04N 21/23892* (2013.01);
(Continued)

(58) Field of Classification Search
CPC ....... H04N 21/23418; H04N 21/23892; H04N 21/4334; H04N 21/44008; H04N 21/8358; G06F 21/16
See application file for complete search history.

(56) References Cited

U.S. PATENT DOCUMENTS

2001/0051996 A1* 12/2001 Cooper .................. G06Q 10/10
709/217
2003/0112974 A1  6/2003 Levy
(Continued)

FOREIGN PATENT DOCUMENTS

EP      2693395 A1   2/2014
WO  2015/067964 A2   5/2015

OTHER PUBLICATIONS

PCT International Search Report for PCT/GB2015/051653 dated Aug. 31, 2015.
(Continued)

*Primary Examiner* — John Schnurr
(74) *Attorney, Agent, or Firm* — Carter, DeLuca, Farrell & Schmidt, LLP; George Likourezos, Esq.

(57) ABSTRACT

A method of securing and/or tracing video media-content which comprises a plurality of frames, the method comprising, receiving at least one candidate media-content which has been determined to have a fingerprint substantially the same as a reference fingerprint generated for the video media-content, processing the candidate media-content after comparison with the video media-content used to generate the reference fingerprint to temporally align the candidate media-content to identify which frames contain the unique
(Continued)

identifier; and extracting the unique identifier from the identified frames within the or each candidate video media-content to identify the user ID held within the unique identifier.

20 Claims, 9 Drawing Sheets

(51) Int. Cl.
*G06F 21/16* (2013.01)
*H04N 21/433* (2011.01)
*H04N 21/2389* (2011.01)
*H04N 21/44* (2011.01)
*H04N 21/8358* (2011.01)

(52) U.S. Cl.
CPC ... *H04N 21/4334* (2013.01); *H04N 21/44008* (2013.01); *H04N 21/8358* (2013.01)

(56) References Cited

U.S. PATENT DOCUMENTS

| | | | |
|---|---|---|---|
| 2003/0123698 A1* | 7/2003 | Murakami | G06T 1/0064 |
| | | | 382/100 |
| 2011/0188700 A1 | 8/2011 | Kim et al. | |
| 2012/0272327 A1 | 10/2012 | Shin et al. | |
| 2013/0236046 A1 | 9/2013 | Nallusamy et al. | |
| 2014/0325550 A1 | 10/2014 | Winograd et al. | |

OTHER PUBLICATIONS

Karthik et al., "Video Fingerprinting and Encryption Principles for Digital Rights Management", Proceedings of the IEEE, IEEE, New York, vol. 92, No. 6, Jun. 1, 2004, pp. 918-932.
UK IPO Search Report for GB1503954.8 dated Apr. 2, 2015.
UK IPO Search Report for GB1509829.6 dated Aug. 18, 2015.
UK IPO Examination Report for GB1509829.6 dated Feb. 23, 2016.
UK IPO Examination Report for GB1509829.6 dated May 10, 2016.
UK IPO Examination Report for GB1509829.6 dated Sep. 23, 2016.
Examination Report under Section 18(3) for Appln. No. GB1509829.6 dated Jun. 8, 2017.

* cited by examiner

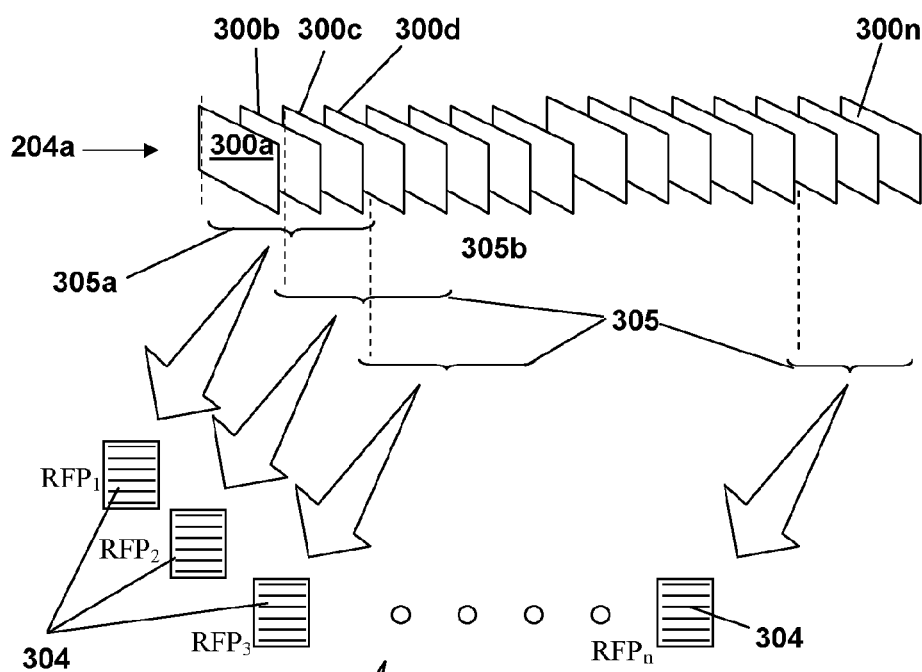
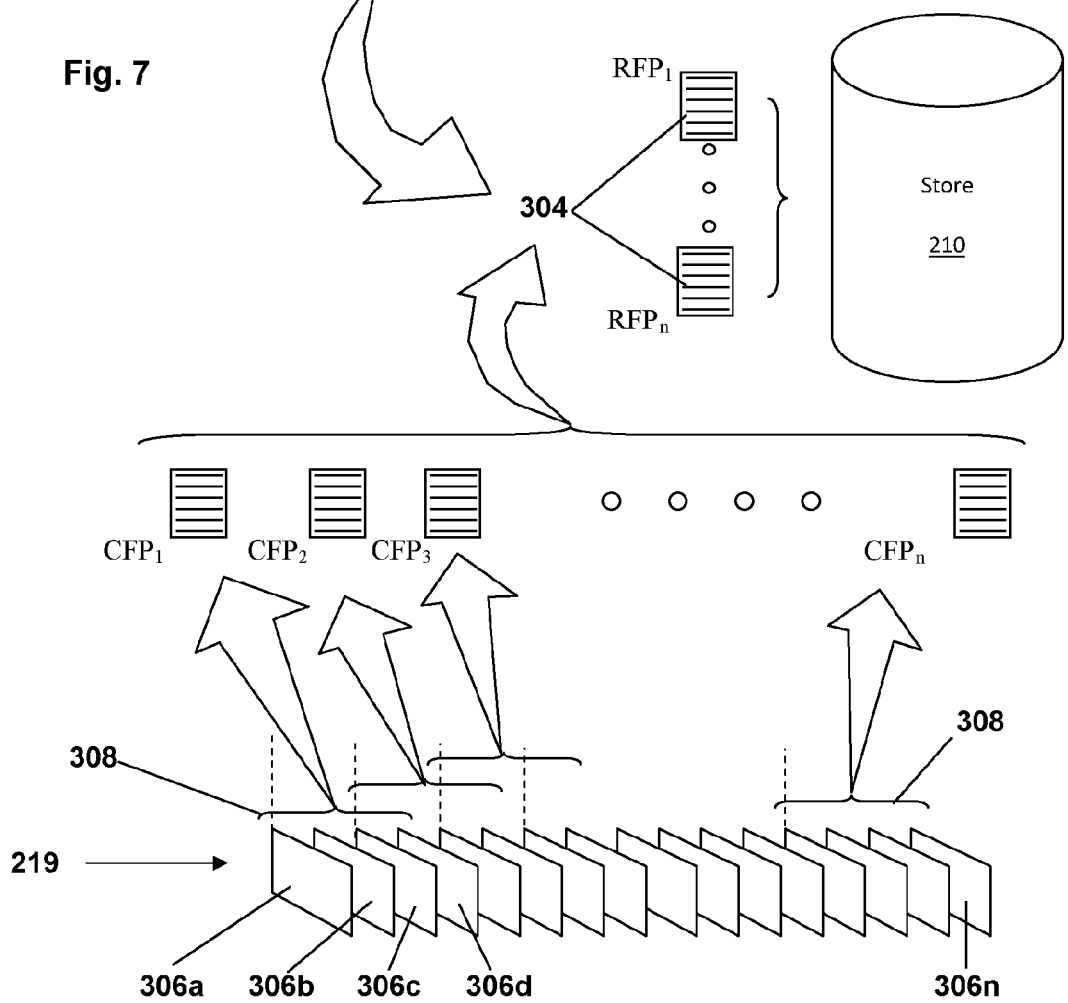
Fig. 7

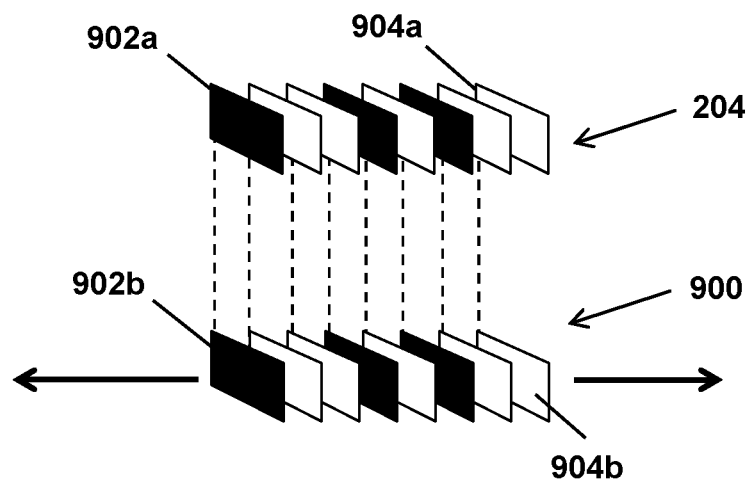
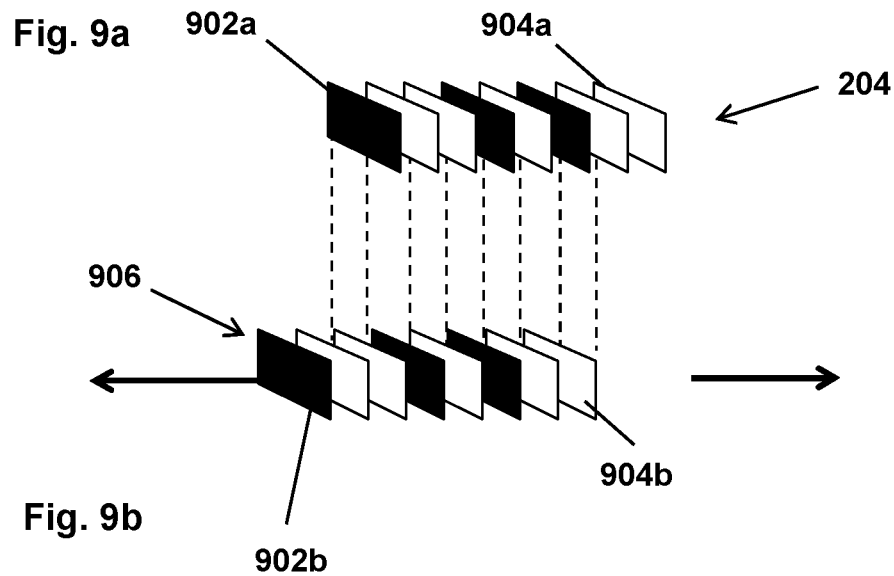

SECURITY AND/OR TRACING VIDEO MEDIA-CONTENT

This invention relates to systems and methods for the identification of users and/or devices to which media content was sent. Some embodiments relate to extracting markers from media content, wherein the markers may provide a unique identifier. In particular, but not exclusively, embodiments relate to processing video, which might be streamed video.

The advent of computer networks, such as the Internet and the World Wide Web (WWW) has meant that computing devices are becoming massively interconnected, facilitating the copying and redistribution of media content on an unprecedented scale. Media content is very valuable and techniques are known for trying to protect media content. Such techniques include the watermarking of media content so that it has a specific signature and also the fingerprinting of content in order to detect characteristics of the content without actually imposing a characteristic onto the content. Numeric or alphanumeric user IDs may also be superimposed in the corner of video content.

As the bandwidth available on such networks has increased, the nature of the content held and viewed on those networks has changed from text based information to the present day where it is now common to have video based data. Nonetheless, whatever the type of content there is an ongoing desire to identify illicit copies of the content, generate usage data for the content, provide mechanisms to deliver content to users and the like. Given the massive amounts of data available on networks such as the Internet and WWW, the monitoring of the usage of the data on those networks has become difficult, and is now virtually impossible to perform manually.

Moreover, as networks are used as the delivery mechanism for media content of events such as sporting events, movies, and the like, a significant amount of content, often video content, can be delivered. As such, it is a problem to find techniques that are fast enough to process the significant amounts of information.

According to a first aspect of the invention there is provided a method of tracing video media-content which comprises a plurality of frames, the method comprising at least one of the following steps:

a) arranging a media-delivery platform to have a plurality of target devices connected thereto and further arranging the media-delivery platform to deliver the video media-content to a user ID being used at one of the target devices;

b) recording a reference fingerprint representing the video media-content;

c) generating, at each target device, a unique identifier based on the user ID being used at the device to which media content is being delivered,
  i) wherein the unique identifier comprises one or more visual markers distributed across at least one frame of the video media-content at positions which are calculable based on the user ID; and
  ii) selecting the at least one frame of video content to be marked with the unique identifier such that the unique identifier is displayed at calculable times when the video media-content is displayed;

d) monitoring a network to detect video media-content having a fingerprint which is the same, or at least substantially the same, as the reference fingerprint where each so detected video media-content provides a candidate media-content to be decoded; and e) extracting the unique identifier from within the or each candidate video media-content to identify the user ID being used at the target device to which the video media-content was delivered.

At each target device, the unique identifier may be associated with the media-content such that, when the media-content is reproduced, the media-content comprises the unique identifier.

Advantageously, the association of the unique identifier with the media-content allows the user for whom the media-content was delivered to be identified, by way of the user ID.

According to a second aspect of the invention there is provided a method of securing video media-content which comprises a plurality of frames, the method comprising at least one of the following steps:

i) receiving, at one or more target devices, video media-content from a media-delivery platform;

ii) generating, at each target device, a unique identifier based on a user ID being used at that target device, iii) wherein the unique identifier comprises one or more visual markers distributed across at least one frame of the video media-content at positions which are calculable based on the user ID; and iv) causing the at least one frame of video content having the unique identifier to be displayed at calculable times when the video media-content is displayed.

According to a third aspect of the invention there is provided a method of securing and tracing media-content, the method comprising at least one of the following steps:

arranging a media-delivery platform to have a plurality of target devices connected thereto and further arranging the media-delivery platform to deliver the media-content to a user ID being used at one of the target devices;

recording a reference fingerprint representing the media-content;

generating, at each target device, a unique identifier based on the user ID being used at the device to which the media content is being delivered;

associating, at each target device, the unique identifier with the media-content such that, when the media-content is reproduced, the media-content comprises the unique identifier;

monitoring a network to detect media content having a fingerprint which is the same, or at least substantially the same, as the reference fingerprint where each so detected media-content provides a candidate media-content to be decoded; and extracting the unique identifier from within the or each candidate media-content to identify the user ID being used a the target device to which the media-content was delivered.

According to a fourth aspect of the invention there is provided a method of securing media-content, the method comprising at least one of the following steps:

receiving, at one or more target devices, media-content from a media-delivery platform;

generating, at each target device, a unique identifier based on a user ID being used at that target device;

associating, at each target device, the unique identifier with the media-content such that, when the media-content is reproduced, the media-content comprises the unique identifier.

(ii) if the media-content comprises aural content, the unique identifier also comprises aural content.

According to a fifth aspect of the invention, there is provided a method of securing and/or tracing video media-content which comprises a plurality of frames, the method comprising at least one of the following steps:
- i) receiving at least one candidate media-content which has been determined to have a fingerprint substantially the same as a reference fingerprint generated for the video media-content;
- ii) processing the candidate media-content after comparison with the video media-content used to generate the reference fingerprint to temporally align the candidate media-content to identify which frames contain the unique identifier;
- iii) extracting the unique identifier from the identified frames within the or each candidate video media-content to identify the user ID held within the unique identifier.

According to further aspects of the invention there are provided systems arranged to implement the above methods.

According to further aspects of the invention there are provided a machine readable medium containing instructions which when run on a machine cause that machine to either perform on of the methods or to perform as a system providing an embodiment described herein.

The skilled person will appreciate that a feature of any one aspect of the invention may be applied, mutatis mutandis, to any other aspect of the invention.

Further the skilled person will appreciate that elements of the aspects may be provided in software. However, the skilled also appreciate that any software element may be provided in firmware and/or within hardware, or vice versa.

The machine readable medium referred to in any of the above aspects of the invention may be any of the following: a CDROM; a DVD ROM/RAM (including -R/-RW or +R/+RW); a hard drive; a memory (including a USB drive; an SD card; a compact flash card or the like); a transmitted signal (including an Internet download, ftp file transfer of the like); a wire; etc.

The skilled person will appreciate that aspects of the invention may offer one or more of the following advantages, as compared to prior art systems:
- (i) less visual degradation due to the short period of time for which markers are visible—therefore lower impact on the viewer experience;
- (ii) lower detectability (from a security perspective) due to when the markers appear being carefully calculated and controlled by an algorithm unknown to an illegal copier;
- (iii) increased resistance to masking due to the above;
- (iv) lower computational requirement on the user device:
  - a. the calculations to be performed are relatively lightweight; and
  - b. the calculations are only performed at infrequent points in time, which can be calculated, rather than continually;
- (v) more efficient detection of markers due to:
  - a. using time-localised fingerprint matching to determine where to look and when (eg look at all media streams known to match a given channel within the past n minutes); and
  - b. precise re-synchronisation against the time at which the media-content was processed in a fingerprint generator to identify a narrow time window/small number of frames during which the markers will appear, to ensure that only a small number of frames need to be processed in order to extract the markers, which may encode the user ID. Re-synchronisation may also be described as temporal alignment;
- (vi) increased resistance to be decoded resulting from using time (or a value linked to time, for example a presentation timestamp of the frame on which the markers are placed or an arbitrary randomly-generated binary value that can be externally linked to time, or the like) as a factor in varying the placement of the markers within one or more frames, and so further using the precise re-synchronisation as part of the security of the representation of the ID itself—ie changing the shape, style, colour, and/or position, or the like, of the markers depending on when in the media-content the markers are to be placed There now follows, by way of example only, a detailed description of embodiments of the invention with reference to the accompanying drawings of which:

FIG. 1 schematically shows a system arranged to deliver media streams to users;

Figure 8A:
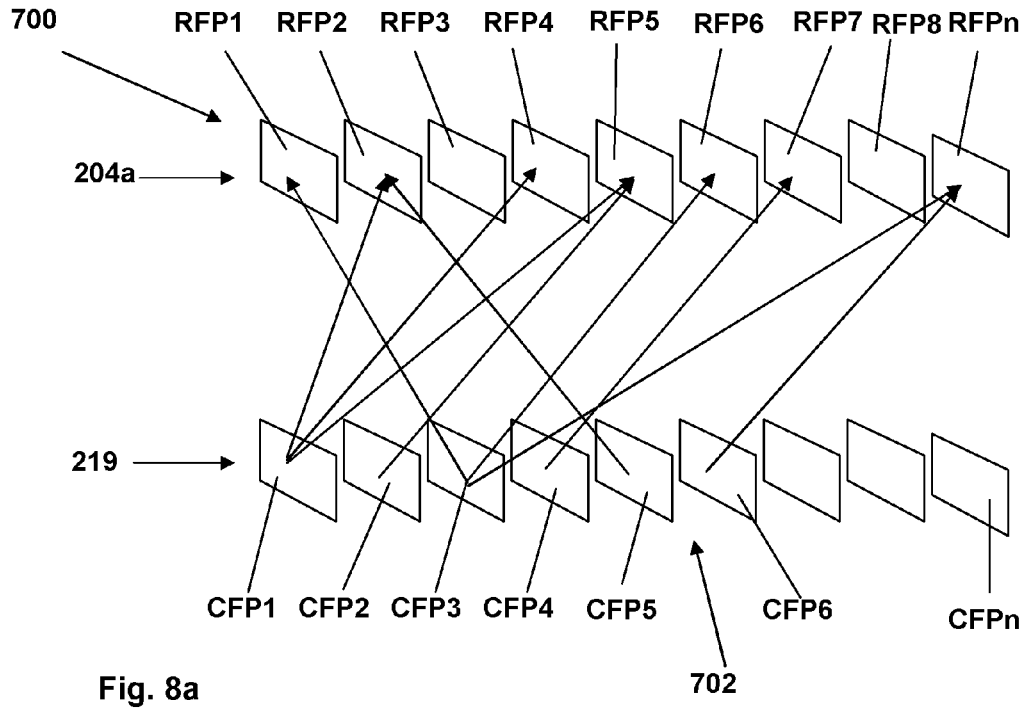
Figure 8B:
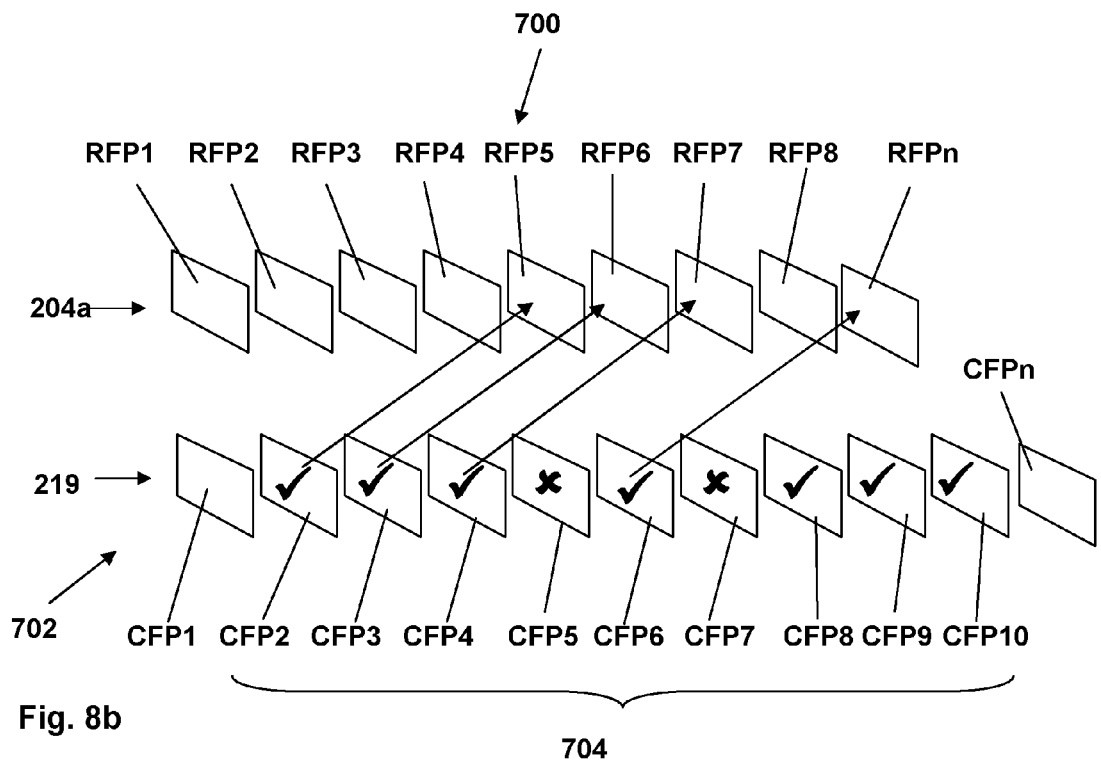

FIG. 7 schematically shows how fingerprints of the media streams are generated;

FIG. 8a exemplifies a process of determining whether a candidate fingerprint matches a reference fingerprint;

FIG. 8b exemplifies a series of matching fingerprints within a series of candidate fingerprints;

FIG. 9 exemplifies how two media streams are aligned with one another; and

Figure 10:
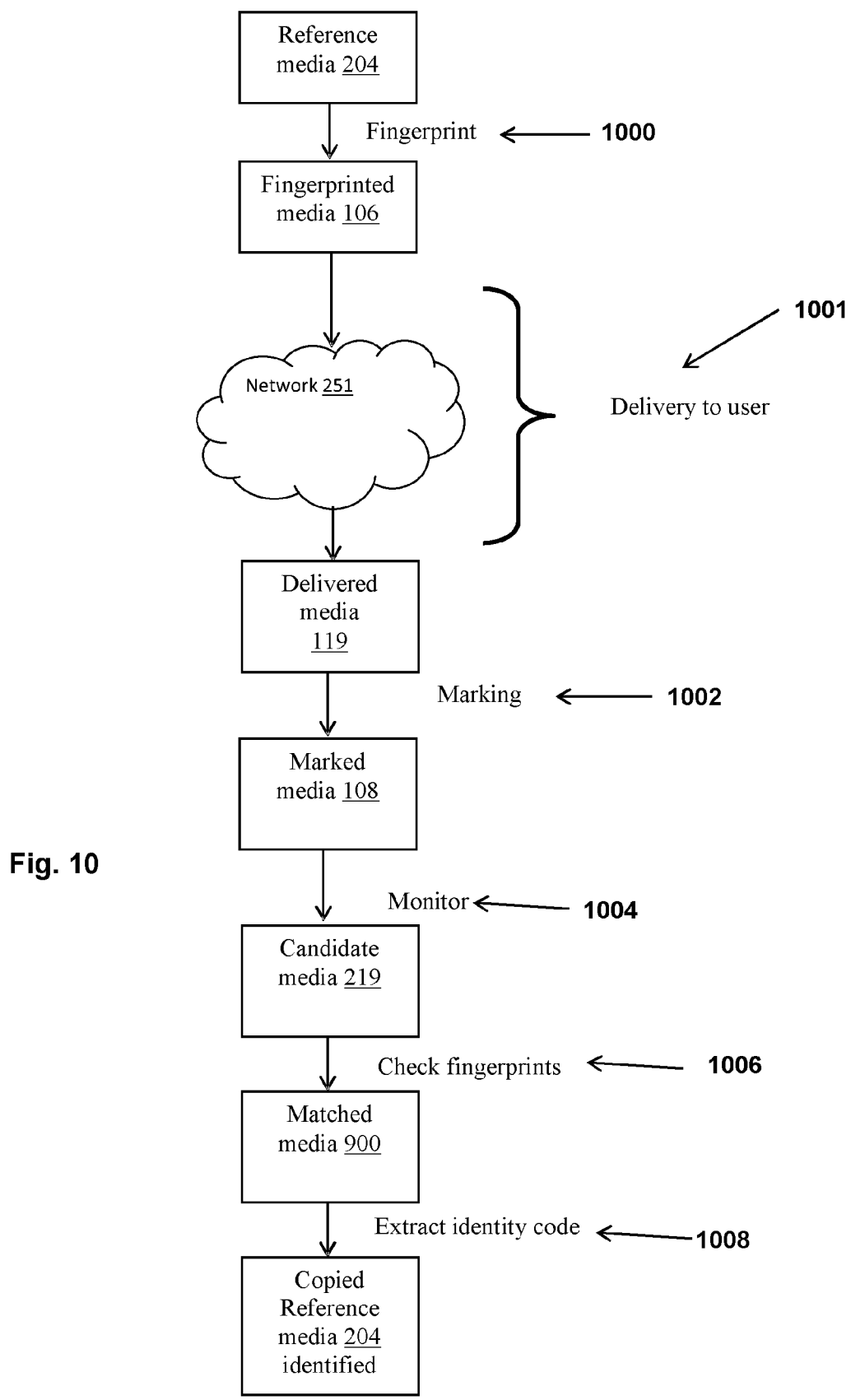

FIG. 10 shows a flow chart of the processing of media by embodiments.

The following description provides a description of various embodiments and the skilled person will readily appreciate that a feature described in relation to a given embodiment may be applied, mutatis mutandis, to any of the other embodiments.

Further, it is convenient to describe the system in relation to the monitoring of video streams as the mechanism to deliver media content to a user. However, in other embodiments, the techniques described may be equally applied to other forms of media content. For example, video files such as MP4 files and the like may be thought of as being media content. Thus, reference to stream in the text below should not be taken as limited the streaming of media and is also intended to refer to non-streamed delivery mechanisms, including broadcast.

Reference is made throughout the following description to FIG. 10 which illustrates the overall process that is employed, by embodiments, to monitor and/or protect media content.

The system 100 shown in FIG. 1, which may be thought of as a media delivery platform, allows a reference media stream 204 (ie media content) to be fingerprinted so that it can be identified as described hereinafter. However, UK Patent Application GB1319783.5 describes the Fingerprinting in more detail. The skilled person is directed to read the contents of this earlier application in relation to the fingerprinting and the content of that earlier application is incorporated by reference Further, the system 100 allows the reference media stream 204 to be delivered to a plurality of users and marked 110, according to a User ID, at the user device 120, 122, 124. Thus, the system may be thought of as delivering the media stream (ie media content) to a User ID. Advantageously, the media stream 204 is marked such that the version of the media stream 204 reproduced for the user 108a, 108b, 108c comprises a unique marker 111 or set of markers 111, thus generating a unique version of the media stream 204 to be displayed for each User ID to which the media stream is delivered. The unique marker or set of markers 111 may be referred to as a unique identifier. The unique marker allows the user to which a given version of the reference media stream was delivered to be identified as described below.

The markers 111 may be opaque, or in other embodiments the markers 111 may be semi-opaque (ie partially transparent) as is the case in the embodiment being described. Embodiments have semi-opaque markers 111 are believed advantageous as it may make detecting the markers harder for third parties.

Yet further, the system 100 allows a network, which in the embodiment being described is the Internet and/or the World Wide Web 102, to be monitored for copies, or other illicit versions (hereinafter referred to as 'copies'), of the reference media stream 204. Should copies be detected then the system is arranged to determine, using the marker(s) 111, the User ID to which that version of the reference media stream was delivered. The monitoring system is further described in UK Patent Application GB1401130.8. The skilled person is directed to read that Application to obtain details of the monitoring system and the content of that earlier application is incorporated by reference.

Figure 1:
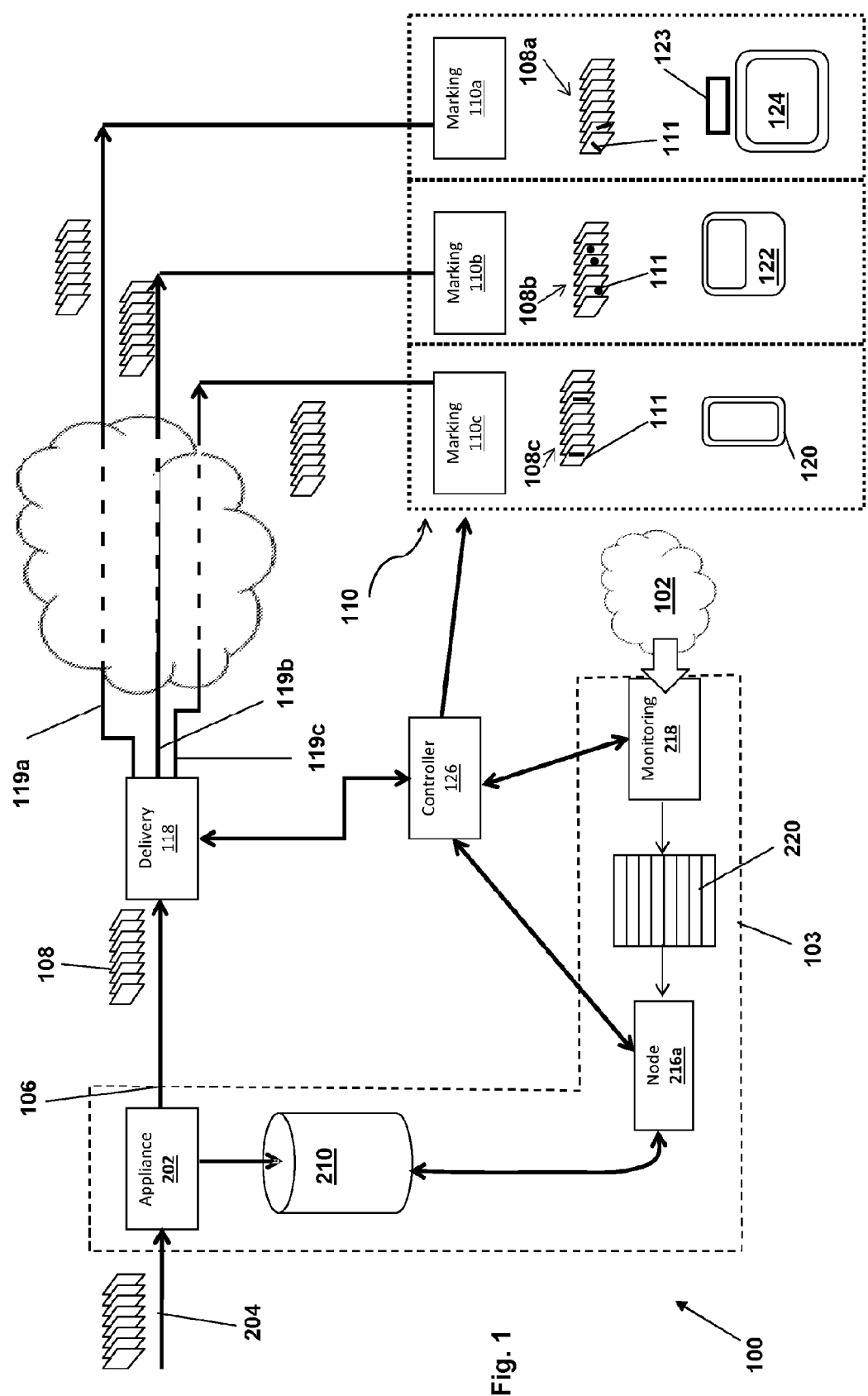

Thus, referring to FIGS. 1 and 10, it can be seen the reference media stream 204 is passed through a fingerprinting process 1000 provided on a reference fingerprint generator 202 which generates a reference fingerprint RFP useable to determine if a candidate media stream matches a reference media stream 204 monitored by the system. The fingerprints generated by the generator 202 are maintained within a store 210. As described hereinafter, and in the embodiment being described, the fingerprinting process also records ORB descriptors (Oriented FAST and Rotated BRIEF) for at least some of the frames of the media stream 204. Embodiments using such ORB features have advantages as described hereinafter, but it is believed that such image feature descriptors are optional.

Figure 2:
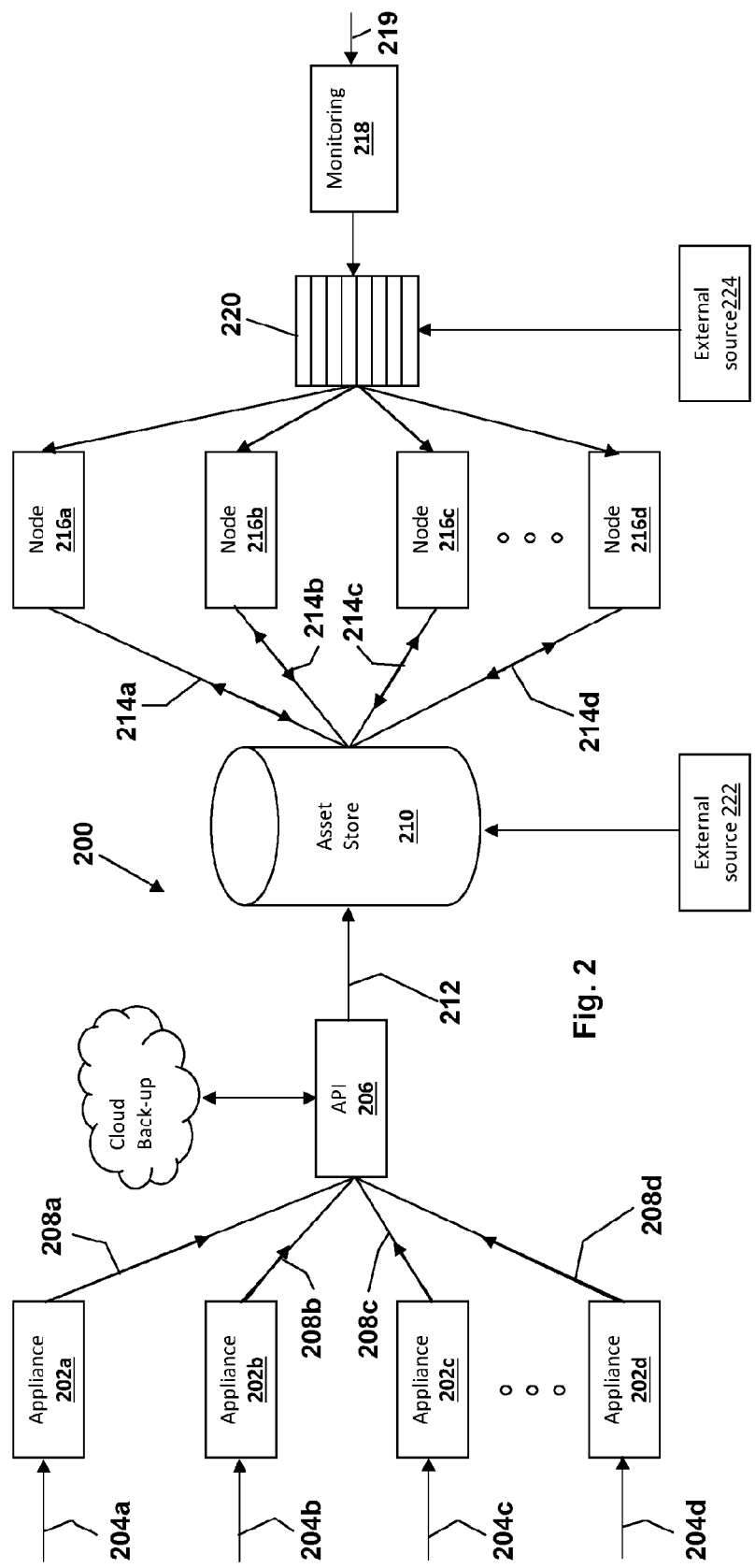
FIG. 2 shows further detail of a portion of the system of FIG. 1.

The components of the fingerprinting system are described in more detail in FIG. 2 and elements of FIG. 1 described in more detail in FIG. 2 are shown within the chain-line 103 and like parts are referred to with like reference numerals.

The fingerprinted media stream 106 is then delivered 1001 to one or more User ID's to be displayed on a user device, and may then be referred to as the delivered media stream 119.

The delivered media stream 119 passes through a marking process 110, 1002 which is dependent on the User ID for whom the content is being delivered 118. The marking processes 110a, 110b, 110c therefore each produce distinct versions 108a, 108b, 108c of the fingerprinted media stream 106 when displayed on the user device. Thus, should the media content that is being displayed on a user device be copied a distinct version is generated, which may be termed a marked media stream 108a, 108b, 108c.

In the embodiment being described, the position of the markers 111 relative to the media may be determined using user identifying information, for example a User ID or the like. Thus, the position of those markers 111, should they be identified in any candidate media stream (as described hereinafter), may be used to determine the User ID to which the media stream was originally sent. In other embodiments, the appearance (ie shape, colour, number, or the like) may be varied as opposed to the position of the markers.

The marker 111, or combination of markers 111, applied to the fingerprinted media stream 106 are therefore advantageously unique to the User ID used to generate the marker. The skilled person will understand that the markers 111 can be used to identify the user, in an automated way, by the system and process described below.

The skilled person would understand that the marking process 110, 1002 may be performed by the device which displays the media content (for example, a television, a set top box, computer, mobile phone or the like) or by an associated device (for example, a set-top box, encoding module or the like) that processes the media content to generate a display.

As described hereinafter, markers 111 are associated with one or more frames of the delivered media stream 119 such that when the delivered media stream is displayed a distinct versions of the delivered media stream 119 is created. The skilled person would understand that the markers 111 may be associated with successive frames (as in the embodiment being described) or scattered throughout the delivered media stream 119.

In the embodiment being described, the marker is associated across a plurality of frames so that a plurality of frames are needed to recover the marker. In other embodiments, the same marker is associated with one or more frames, and the marker (and therefore User ID) user can be recovered from a single marked frame.

In the embodiment being described, the code is embedded in the relative position on the frame of the markers with respect to each other. In alternative or additional embodiments, the absolute position(s) of the marker(s) 111 on each frame may be used.

In the embodiment being described, the markers 111 comprise concentric circles. The code is embedded in the spacing between circumferences of the concentric circles. In alternative or additional embodiments, the markers may comprise lines radiating from a point, and the code may be embedded in the angles between the lines. The skilled person would understand that many other implementations using relative positions of markers 111 are available.

In embodiments wherein absolute positions of markers are used to embed the code, the markers 111 may be straight or curved lines, dots, or any other symbol or combination of symbols.

However, regardless of whether absolute and/or relative positions are used, the skilled person will appreciate that an algorithm is used to position markers across one or more frames in a known manner, based upon the User ID, such that the position of the markers can later be used to recover the User ID from a candidate media stream.

In the embodiment being described, the appearance of the markers 111 (for example, straight lines, dots, concentric circles, or the like) is pre-determined. In alternative or additional embodiments, the appearance of the markers 111 may be variable. In such embodiments, it is advantageous to be able to vary the appearance of markers 111 using information transmitted over a secure data channel. The skilled person would understand that the appearance of markers 111 may be varied depending on the media stream being transmitted.

In some embodiments, the appearance may be altered to make the markers 111 more or less noticeable when associated with the media stream—for example, using greyscale markers when the content is black and white video, and coloured markers when the media content is coloured, or vice versa. In such embodiments, the marker appearance to use may be determined by visual analysis of the media stream during fingerprinting, and/or by the device that associates the marker 111 with the delivered media stream.

In alternative or additional embodiments, the appearance of the markers 111 may be changed, over time or for different media content, in the aim of defeating any marker-removal algorithms developed by malicious users.

Additionally or alternatively, external parameters may be used in some embodiments to vary the position(s) and/or other characteristics of the marker(s) 111 for a given user. Advantageously, the use of external parameters may make locating and masking the markers 111 more difficult. Examples of external parameters may include, but are not limited to, time or date of delivery of the media stream, timestamp of a frame, data sent securely to the marking device, or identifying information of the content of the media stream, such as programme code or title, or channel information. The skilled person would understand that marker number, colour, style, shape, symbol or the like could be varied instead of, or as well as, position. The linkage of the position or other characteristic of the marker(s) 111 with a time-based factor (whether this be time of transmission, time of display, presentation timestamp of the frame on which the marker 111 is placed, or the like) or a variable that can be externally linked to time (such as an arbitrary randomly-generated binary value, a value calculated from time and one or more other factors, the share price of a company, or the like), in order to increase the robustness and therefore useful lifetime of the marker 111.

It is conceivable that in some embodiments, every frame within the marked streams 108a, 108b, 108c might be marked. However, it is thought that such embodiments would have a negative impact on user experience and/or make the markers easier to locate (and therefore the system becomes easier to defeat). In most embodiments, the majority of frames are not marked. In some embodiments, a block of sequential frames might be marked. In other embodiments, every Nth frame may be marked (where N might be an absolute number or a function).

In alternative or additional embodiments, a time window relative to the media stream within which the markers will be placed is identified. The markers may appear on one frame, on a plurality of successive frames, or on a plurality of spaced frames, within the time window. In one embodiment, the time window may have a length of roughly 3 seconds. However, in other embodiments, the window may be roughly any of the following: 100 ms; 200 ms; 300 ms; 400 ms; 500 ms; 600 ms; 700 ms; 800 ms 900 ms; 1 second; 1.5 seconds; 2 seconds; 4 seconds; 5 seconds; 10 seconds (or any value in between these). Advantageously, limitation of the duration of the display of the markers to being within the window limits distortion of the marked media stream for the user when it displayed; ie so that the user may actually notice the markers 111. Additionally, markers 111 which are only displayed briefly are harder for malicious users to identify and edit out.

In the embodiment being described, the positions of marked frames within the media content are calculable based on media content information and an algorithm used for marking the frames. The skilled person would understand that being able to calculate the positions of marked frames reduces the computational power required to identify markers, as it is not necessary to analyse every frame. Advantageously, the algorithm used to determine which frames to mark/the times at which markers 111 are displayed is not publically available and results in markers 111 being displayed at different times in different streams. The skilled person would appreciate that markers appearing at unknown times within a media stream, and in differing positions between media streams, and potentially also between different times within the same media stream, makes the markers harder to identify and remove.

Media content information may comprising timing information. In the case of broadcast media streams, then timing information is associated with frames of the broadcast media stream being delivered. Such timing information may allow the marker to be associated with the delivered media content at known locations.

The skilled person would understand that, in embodiments wherein the markers 111 are only displayed on a limited number of frames, it is advantageous to temporally align the marked stream 108a, 108b, 108c with the corresponding original fingerprinted media stream 108 to identify frames in which markers should be present for analysis. A mechanism for such temporal alignment is described hereinafter.

In the embodiment being described, the fingerprinting process 1000 additionally generates metadata which contains descriptors of key features within the frames of the marked media stream, which features are used to temporally and spatially align candidate media streams in order to recover any markers therein. In order to reduce computational complexity and storage requirements, features are not extracted for every frame, and may be extracted every Nth frame. In this embodiment, features are extracted for every 10th frame. Other embodiments may store features for more frames (ie every Nth frame, where N is less than 10), or for fewer frames (ie every Nth frame, where N is more than 10). The features extracted in the current embodiment are in the form of ORB feature descriptors (Oriented FAST and Rotated BRIEF), which allow a rescaled and/or rotated candidate media stream to be reconstituted to the original dimensions during marker extraction.

A delivery process 118 generates media content to be sent to user devices for display. In the embodiment being described, the media stream (media content) 204 is broadcast and is received via set top boxes. However, in the media content may additionally be streamed, multi-cast or the like over other delivery channels, such as the Internet, World Wide Web, or the like.

Three such user devices are shown in FIG. 1: a mobile telephone/tablet 120 (such as an iPhone™; an Android Device™; a Windows™ mobile; or a Blackberry™ or an iPad™; a Kindle™; an Android Tablet™ or the like); a computer 122 (such as a PC running Windows™, LINUX or the like; an Apple computer; or the like) and a set top box 123 with associated television 124. The skilled person will appreciate that the set top box may be implemented within a television 124.). The skilled person will also appreciate that other devices such as; watches; or the like may also provide user devices The skilled person will understand that, if the user device is the property of a given user, identifying the device may identify the user. Alternatively or additionally, a user may log in to a media service from any device to access media content. In such embodiments, identifying the device may not identify the user, as many users may use the same device.

It is therefore advantageous, in many embodiments, to generate the unique version based on user information (such as a User ID, or the like) in preference to device information.

Each user device 120, 122, 124 may be thought of as being a target device to which media content can be delivered. Specifically, a user, using a device 120-124, requests a media stream (ie media content) from the system 100, receives a broadcast stream or the like.

It will be appreciated that in other embodiments, a user may request media content other than a media stream. For example, a user could download a file providing media content (eg a video file or an audio file).

In the embodiment being described, the user devices 120, 122, 124 will typically each receive the same delivered media stream 119; eg a broadcast media stream. A process running within the user device 120, 122, 124 is then arranged to add the marker 111 such that when the media stream is displayed on that user device 120, 122, 124, and a marked stream 108 is generated.

In the case of the television 124 and set top box 123 combination, the marker is added to the delivered media stream 119 by the set-top box 123. Often the set-top box 123 does not have access to the delivered media stream 119 which is delivered via a secure channel. However, in such embodiments, the set-top box 123 can overlay, or otherwise superimpose, content (including the markers described herein) on top of the delivered media stream 119 such that when the television 124 displays the delivered media content 119, it is actually the marked stream 108 that is being displayed (ie a combination of the delivered media stream 119 and the overlay).

In one embodiment, an application is downloaded to the set-top box 123 and it is that application that adds the marker 111 to the delivered media stream 119. As is known in the art of set top boxes, the application can be triggered by various mechanisms such as when a user changes channel or the like.

Other devices such as the telephone 120, or computer 122, may have similar mechanisms to the set-top box 123 in which the marker is superimposed or otherwise combined with the delivered media stream 119.

Should a party copy content being displayed by the television they will typically either copy the output of the set-top box 123 or record the screen of the television 124. Each of the mechanisms of copying the content will result in the marked stream 108 being recorded with the marker present therein.

Additionally, the system 100 determines the identity of the user having the User ID identified by the marker within the marked stream 108. For example, the user is likely to have an account with the provider of the media that they are receiving (ie the broadcaster of the media stream) and the identity of the user may be obtained from the account details of that user. In other embodiments, users may need to input an identifier, etc., for example by logging in, as they request the media stream. In the embodiment being described, which is a broadcast system, the identity of a user is given by a decoder card (or similar mechanism) which is inserted into the set top box 123.

As the media content is delivered to the user devices 120-124 a monitoring system 218 monitors 1004 a network 102 for media having a fingerprint that is stored within the store 210. Should the monitoring system 218 detect, on the network, copies of a reference media stream 204 having a recognised finger print (ie a fingerprint stored in the store 210), then a controller 126 is arranged to identify, using any markers within the copy media stream, the user 120-124 (by identifying the User ID) to which the media was sent. The controller 126 is then arranged, in some embodiments, to stop the delivery of the delivered media stream to that user 120-124 by controlling 128 the delivery process 118.

After the media is delivered to the user devices 120-124 the monitoring system 218 may monitor 1004 the network 102 for media having a fingerprint that is stored within the store 210. Should the monitoring system 218 detect, on the network, copies of a reference media stream 204 having a recognised finger print (ie a fingerprint stored in the store 210), then a controller 126 is arranged to identify, using any markers within the copy media stream, the user 120-124 to which the media was sent. The controller 126 is then arranged, in some embodiments, to suspend delivery of any further media streams to that user 120-124 by controlling 128 the delivery process 118.

The skilled person would therefore understand that such embodiments couple the use of fingerprinting with monitoring in order to determine which candidate media streams are of interest, and also when those media streams of interest should be captured from in order to find the markers 111 placed therein.

More specifically, the results of recent fingerprint matches found by the monitoring system 218 may be used to select a time-window in a given media stream during which the markers 111 should appear—for each media stream, a sample may be taken over a longer time-window (ie more frames) than is necessary, to ensure a capture of the markers 111 even if there is some error in the time-window identification.

The fingerprint match timing information can be used to determine any offset of the sampled media stream with respect to the media stream fingerprinted by the fingerprint generator 202. The offset may be due to transmission latency, or the like.

Timing information from the monitoring system 218 may then be used to determine start-up times of the media streams. The fingerprint and monitoring information can then be used to time capturing from the relevant media streams such that the capturing is running during the precise time period (or "window") during which the markers 111 will be displayed. The skilled person would understand that, advantageously, this allows efficient, short-duration sampling at and around the frame(s) in which the markers 111 should appear, so reducing the volume of data to be transmitted and/or processed.

Although only one fingerprint generator 202 is shown in FIG. 1, the fingerprinting system 200 will typically several reference fingerprint generators 202a, 202b, 202c, 202d. FIG. 2 shows four fingerprint generators 202a-d but this is merely indicative and other embodiments may contain any number.

Each of the reference fingerprint generators 202a-202d may comprise a processing circuit and have an architecture as provided by a typical Personal Computer with an X86 architecture. It is conceivable that reference fingerprint generators 202a-d are provided as virtual machines but typically embodiments will provide the reference fingerprint generators as hardware devices which are associated with reference media streams 204a-d and thereby have input thereto at least one reference media stream 204a, 204b, 204c, 204d.

Typically, the reference fingerprint generators 202a-d are situated, in the case of monitoring media streams, within a media generating organisation, such as a broadcaster or the like. The reference media stream 204a-d is typically arranged so that it is a T off a broadcast feed in order not to interfere with the broadcast.

Each of the reference fingerprint generators 202a-d functions as described below and generates fingerprints from the reference media stream 204a-204d to generate a sequence of reference fingerprints RFPn (where n is intended to be an integer number). The reference fingerprint generator 202a-d is then arranged to output the generated reference fingerprints (ie the sequence of reference fingerprints) to a further processing circuit 206 which hosts a system to process the received reference fingerprints RFPn. Thus, the reference fingerprint generators 202a-202d are connected, typically via Wide Area Network such as the Internet, to the processing circuit 206 via connections 208a, 208b, 208c, 208d. The processing circuit 206 may be provided by a server (such as having an X86 architecture), a virtual server, a plurality of such machines, or the like.

As described in more detail below, the processing circuit 206 processes the received reference fingerprints RFPn within the sequence and stores them within the store 210 which thus provides a store of reference fingerprints. The store 210 may be thought of as an asset store. In the embodiment being described, the store 210 is connected to the processing circuit 206 via a network connection 212, which may be a Wide Area Network connection such as the Internet. Thus, in the embodiment being described the processing circuit 206 and the store 210 are provided in two separate machines. However, the skilled person will appreciate that in other embodiments, the processing circuit 206 and the store 210 may be provided within a single machine or more than two machines.

Connected to the store 210, via network connections 214a, 214b, 214c, 214d, which again may be Wide Area Network connections such as the Internet, is at least one and typically a plurality of identification processing mechanisms 216a, 216b, 216c, 216d. In the embodiment being described there are four such identification processing mechanisms 216a-d but in other embodiments that may be any other number. It is an advantage of some embodiments that it is highly scalable as further appliances 202 and/or identification processing mechanisms 216 can be added to the system 200 in order to increase its throughput. The identification processing mechanisms 216 may be provided by physical machines (such as PC's, Apple Computers, or the like) or may be provided within a virtual environment such as a virtual server or the like in a cloud environment. As with the reference fingerprint generators 202 the identification processing mechanisms 216 may not be provided with a display and/or graphics systems.

A monitoring system 218 is arranged to monitor and/or identify data existing on data sources accessible by the system. In the embodiment being described the data are media streams, such as videos and may be Internet streams. In the embodiment being described, these are found via links on the World Wide Web (WWW) and thus, the data-sources are provided by web-sites, user-forums, chat-rooms or the like that are accessible over the WWW. In other embodiments the data being monitored may be other than media streams and may in particular be non-streamed media such as an audio file (eg mp3; way; or the like) or a video file (such as MP4; WMV; or the like). Thus, the monitoring system 218 is arranged to receive a candidate media-stream which it is arranged to process as described herein. The candidate media stream provides candidate media content to be decoded from which an attempt is made to extract a marker as described hereinafter.

In alternative, or additional, embodiments, the system may be arranged to monitor sources of data over a network other than the WWW. For example, the network 251 may be the Internet (and not the WWW), or the like.

The monitoring system is typically provided by a plurality of processing circuits, which may be physical machine, virtual machines or a mixture of both.

In the embodiment being described, the monitoring system 218 is arranged to generate sequences of candidate fingerprints CFPn (where the n is intended to be an integer number) for one or more candidate media-streams 219 that the system 200 is arranged to monitor. Typically a sequence of candidate fingerprints CFPn is generated for each of the candidate media-streams. In other embodiments, the system may not generate the candidate fingerprints CFPn.

Thus in this embodiment an identification processing mechanism 216a-c is arranged to process a sequence of candidate fingerprints CFPn from an input media stream 219.

The, or each, sequence of candidate fingerprints CFPn generated by the monitoring system 218 is then queued in a queue 220 for analysing by the system 200. The system 200 is then arranged such that one of the sequences of candidate fingerprints CFPn from within the queue 220 is assigned to an identification processing mechanism 216a-d which uploads the sequence for further processing. In the embodiment being described the sequences of fingerprints uploaded to an identification processing mechanism 216a-d at a given time are typically representative of one minute of media-stream. A one minute stream, which provides a relatively short period, is particularly convenient for embodiments that are processing streamed media, perhaps so-called live streamed media, or broadcast media, or multi-cast media That identification processing mechanism is then arranged to perform a search for each of the candidate fingerprint CFPn within that sequence to see if that fingerprint CFPn corresponds to (ie matches) any of the reference fingerprints RFPn stored within the system 200. This search process is described further below.

Additionally, or alternatively, embodiments the identification processing mechanisms may be assigned a single fingerprint CFPn from the queue 220.

Figure 3:
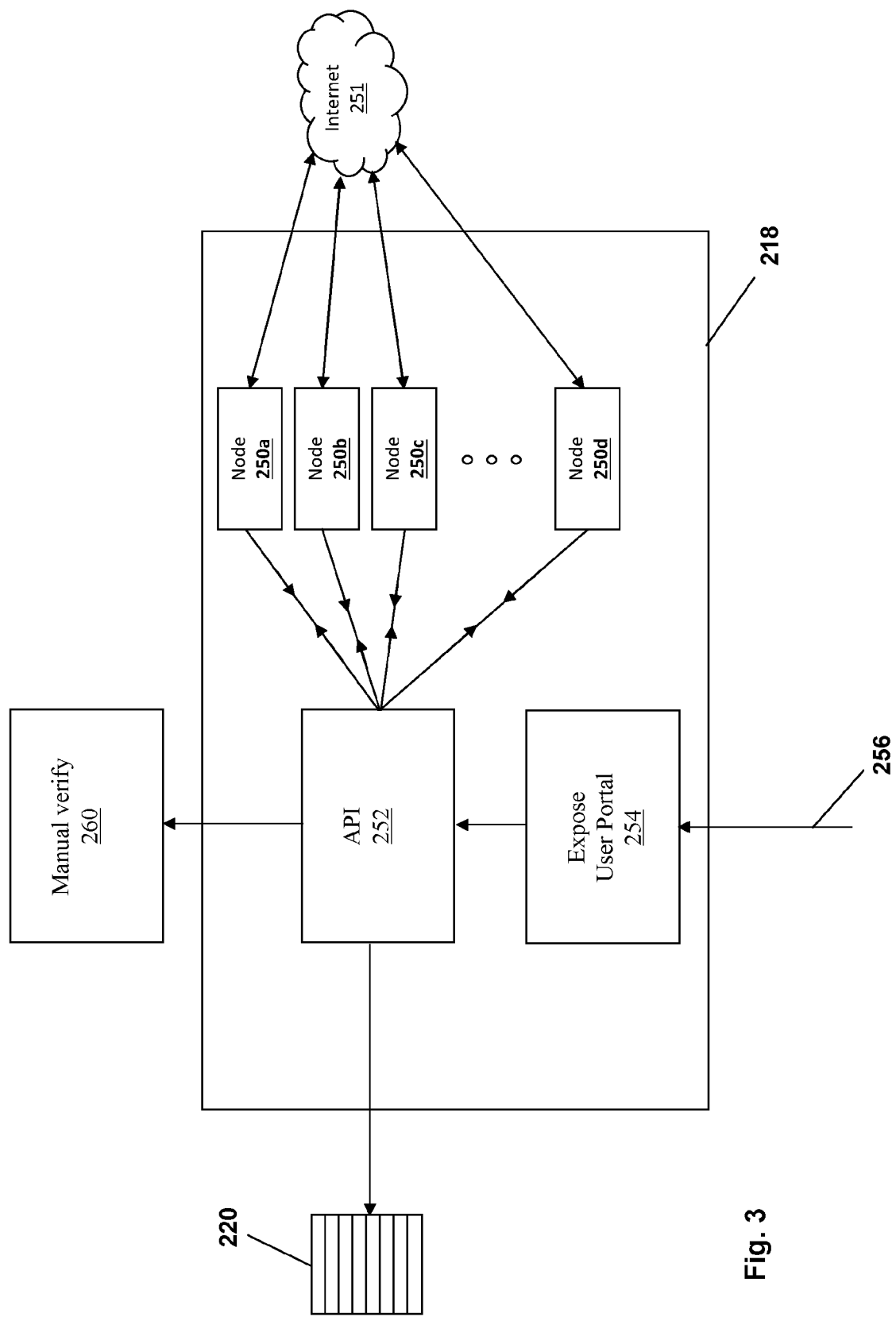
FIG. 3 shows further details of a portion of the system of FIG. 1.

FIG. 3 shows an enlargement of the monitoring system 218 of FIGS. 1 and 2 and is now explained in more detail.

In a similar manner to the identification processing mechanisms 216a-d shown on FIG. 2, the monitoring system 218 comprises a plurality of tailorable processing mechanisms 250a-d. In this embodiment only four tailorable processing mechanisms are shown but in reality there could be a significant number more. Each of the tailorable processing mechanisms is connected to a Network 251.

Each of the tailorable processing mechanisms might be a physical machine. Should the tailorable processing mechanisms be provided as physical machines then they might not comprise a display or display driver, etc. In alternative, or additional embodiments, including the embodiment being described the tailorable processing mechanisms may be provided as a virtual machine.

Each of the tailorable processing mechanisms is controlled by an Application Programming Interface (API) 252 of the system and thus, the system is arranged to control the functionality of the tailorable processing mechanisms 250. It will also be seen that the API is arranged to generate the queue 220 described above.

A user portal 254 allows user input 256 to be made to the API 252 thereby allowing the functionality of the tailorable processing mechanisms 250 to be controlled.

Figure 4:
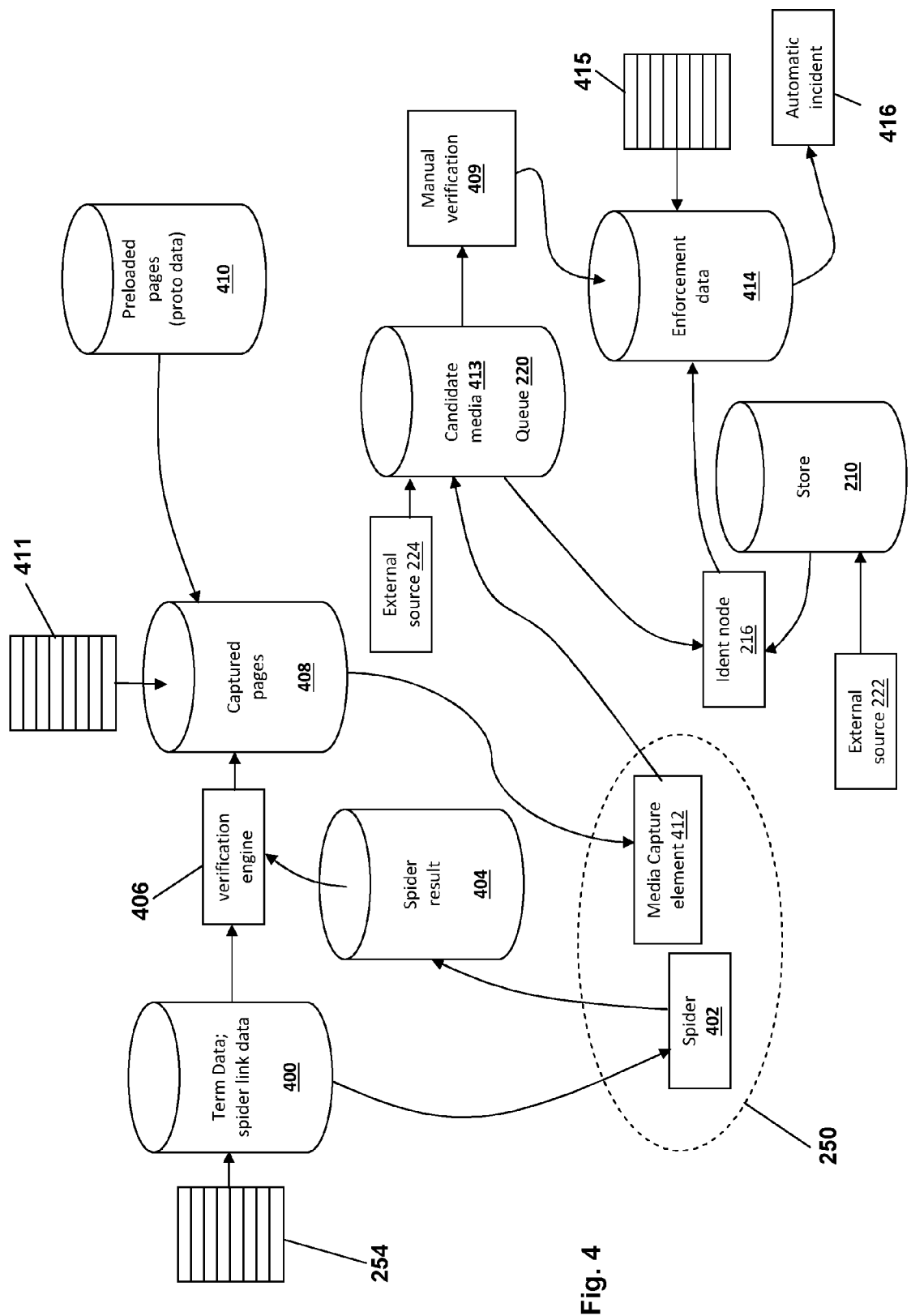
FIG. 4 shows a diagram outlining the processes and data stores performed by an embodiment of a monitoring system which is part of the system of FIG. 1.

FIG. 4 expands on the process flow of the system outlined in FIG. 3. It should be noted that FIG. 4 is a flow diagram rather than a structural diagram but the description below relates aspects of FIG. 4 to the system diagrams of FIGS. 1 to 3.

The system 218 maintains term-data that can be used to locate one or more candidate media-streams for analysis by the system. As such a term-data store 400 is maintained for processing as later described. The term-data held within the store 400 may comprise URL (Universal Resource Locator), search terms, or the like any of which may be used to locate media streams on the network 251.

Terms, URL's or other term-data, may be input into the term-data store 400 via the user portal 254.

The tailorable processing mechanisms 250 shown in FIG. 3 are arranged to act as spiders 402 to collect information from the network 251 from given data-sources on the network, which in the embodiment being described are typically web-pages. In this process, the API 252 assigns a given tailorable processing mechanism 250 a data-source to process, which data-source may be given by the term-data given to the tailorable processing mechanism 250.

For example, if the term-data were a search term then the tailorable processing mechanism 250 is arranged to search the network, or at least a given web-site, or a page of a web site for that search term. If the term-data were a URL then the tailorable processing mechanism 250 is arranged to process that URL. The term-data may include specifying which portions of web-page, site or the like should be searched. In particular, some embodiments may specify tags, parameters, such as XML tags or parameters that should be searched.

The spidering function that the tailorable processing mechanisms 250 are arranged to provide searches the data-source assigned to the tailorable processing mechanism 250 by the API 252 and returns data that might match specified criteria given by the term-data.

In the embodiment being described, the specified criteria would be a media stream that could potentially match a reference media stream for which the store 210 holds a reference fingerprint RFPn representative of that media stream. However, additionally, or alternatively, the tailorable processing mechanism 250 may be arranged to capture other forms of data, such as any form of media file, the data-source suspected of hosting a data-set, or the like.

The tailorable processing mechanism 250 providing the spidering function 402 is arranged to upload the results of tasks that they have been assigned to perform to a spider-results store 404.

The spider results held within the spider-results store 404 are processed by a verification engine 406 which is also arranged to verify data submitted directly via the user portal 256 which is sent directly to the verification engine rather than being located by the spidering function 402 of the tailorable processing mechanisms 250. In particular, the verification engine is, in at least some embodiments, arranged to score meta-data and return a belief in that meta-data. Some embodiments of the system, including the one being described, may then use that belief in how any determination of that meta-data should be used in determining a schedule based upon that meta-data. Here the meta-data might comprise text, XML or HTML tags, or the like that has been scraped, by the spider 402, from the data-source (eg web-page) that it has processed.

In the embodiment being described, the verified results of the spidering 404/information input directly to the system is stored within a store of captured pages 408 for subsequent processing. Reference here to a store of captured pages 408 is suitable for embodiments in which the network 251 is the World Wide Web. However, in other embodiments the store may be more suitably termed a store of captured proto-data; ie data that is potentially relevant and should be further processed by the system.

It is possible for data to be input directly to the captured pages store 408 and this is represented as the input 411 on the Figure. Typically such data would be input via the User Portal 254.

It is again possible that proto-data can be input directly to the store of proto-data, which in the embodiment being described may be thought of as being a pre-loaded pages 410. Such preloaded pages (or other repositories of data) may be pages that are routinely found to host data, such as media streams, or other media data, that meets the specified criteria. In the embodiment being described, the system is arranged to monitor and identify media streams that are copies of the reference media streams 204 and as such, the specified criteria might be that those pre-loaded pages routinely host media streams that are copies of reference media streams 204. In other embodiments, the system is arranged to monitor other than media stream and may be arranged to monitor or otherwise identify any form of media file, or indeed other forms of data.

The proto-data, which in this embodiment are the captured and/or pre-loaded pages, are then processed by media capture elements 412 which may be provided by the tailorable processing mechanisms 250a-d. Again, these media capture elements 412 are controlled by the API 252 which directs and schedules the activity of the media capture elements 412. Thus, in the embodiment being described, the same tailorable processing mechanism 250 is arranged to perform both as the spider 402 and as the media capture element 412. Such an arrangement in which the tailorable processing mechanism 250 had a dual function is believed advantageous because it can lead to an efficient use of resources within the system. Other embodiments, may provide the spider 402 and media capture elements 412 as separate entities.

In the embodiment being described, the media capture elements 412 are arranged to process candidate media streams 219, located within the data-sources (ie web pages), and generate candidate finger prints CFPn and thus, the media capture element 412 provides a candidate fingerprint generator. These candidate finger prints CFPn are stored in the queue 220 for further analysis by the system.

In addition to the generation of the candidate finger prints CFPn the media capture element 412 is arranged to store a copy of at least a portion of the candidate media-stream within a store of candidate media 413. For example, should the candidate media-stream be a video stream then the media capture element 412 may be arranged to store one or more thumbnails representing the video stream. Here, a thumbnail is intended to mean a version in which the or each from is of a reduced resolution, colour content, frame rate, or the like, in order to reduce the amount of space taken to store the thumb-nail when compared to the original media-stream.

In the embodiment being described, the media-capture element 412 is also arranged to store, in the store of candidate media 413, meta data associated with the candidate media-stream. The meta-data stored within the candidate media 413 for each candidate media-stream may include any of the following: the URL that pointed to the media-stream; the IP address from which the media stream was obtained; the time at which the media-stream was obtained; or the like. The meta-data may provide enforcement data and thus, the enforcement data, in at least the embodiment being described, specifies the source from which the media stream was obtained.

Once the candidate fingerprints CFPn have been added to the queue 220 they are processed by the identification processing mechanisms 216 under the direction of the API 252. The identification processing mechanisms 216*a-d* make comparisons against the Reference Fingerprints RFPn held within the store 210 as described elsewhere.

The spider 402 and the media capture element 412 will typically be provided by machines, whether virtual or physical or a combination thereof, which are within, directly connected to, or the like, the network 251. It will be appreciated that such embodiments are advantageous as the spider 402 and media capture elements 412 make regular access to the network 251 and thus proximity to the network 251 is advantageous in that it will reduce network traffic.

Further, at least some embodiments, including that being described, arrange the identification processing mechanisms 216 such that they are separated from network 251. Such separation may be provided by a firewall, Demilitarized Zone (DMZ), or the like. It will be noted that in some embodiments, including that being described, identification processing mechanisms 216 are more closely connected to the system 200 when compared to the spider 402 or the media capture element 412 and as such it is advantageous to separate them from the network 251 to increase the security of the system 200. Thus, embodiments that structure the identification processing mechanisms 216 such that they are protected from the network 251 address the security of the system.

Once the identification processing mechanisms 216 have identified Candidate Fingerprints CFPn as being a match to a reference Fingerprint RFPn held within the store 210 they are, in the embodiment being described, arranged to upload, or otherwise transmit, details of the media stream to an enforcement data store 414, which includes meta-data associated with the candidate-media-stream.

In at least some embodiments, it is possible for enforcement data to be added directly to the store 414 and this is represented by the element 415 in the Figure. Such data may be added via the user portal 254.

In the embodiment being described, the spider 402 can be instructed, by the API 252, to repeat the process that was assigned to it in the term-data. The repetition may be performed periodically at regular intervals such as substantially at every 10 minutes, 15 minutes, 20 minutes, 30 minutes, or the like. Other embodiments may be arranged to repeat the process at irregular intervals.

Figure 5:
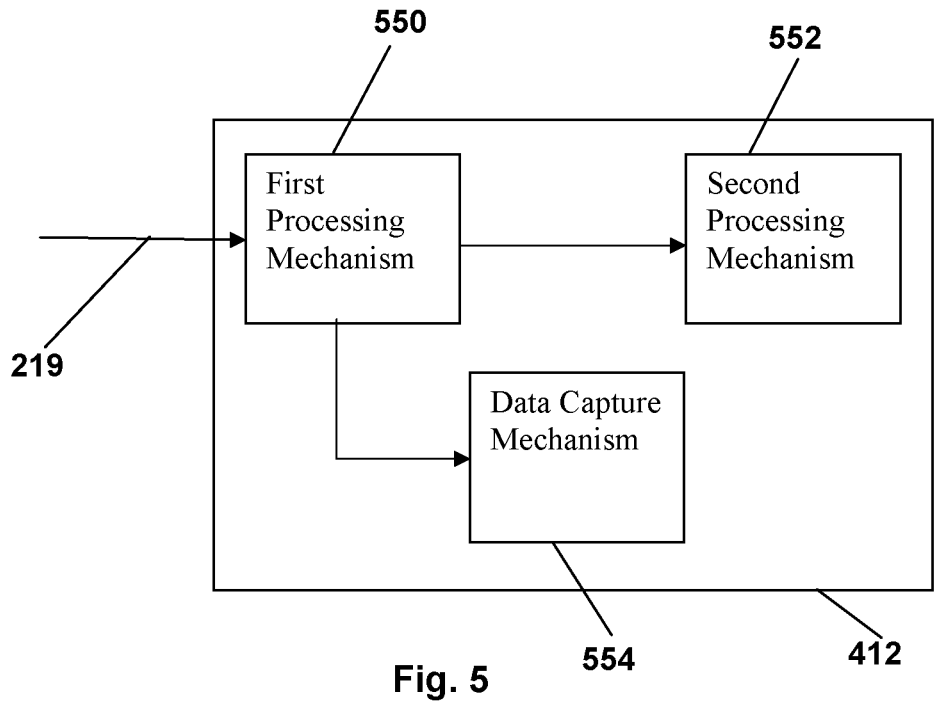
FIG. 5 shows further details of a media capture element of FIG. 4.
Figure 6:
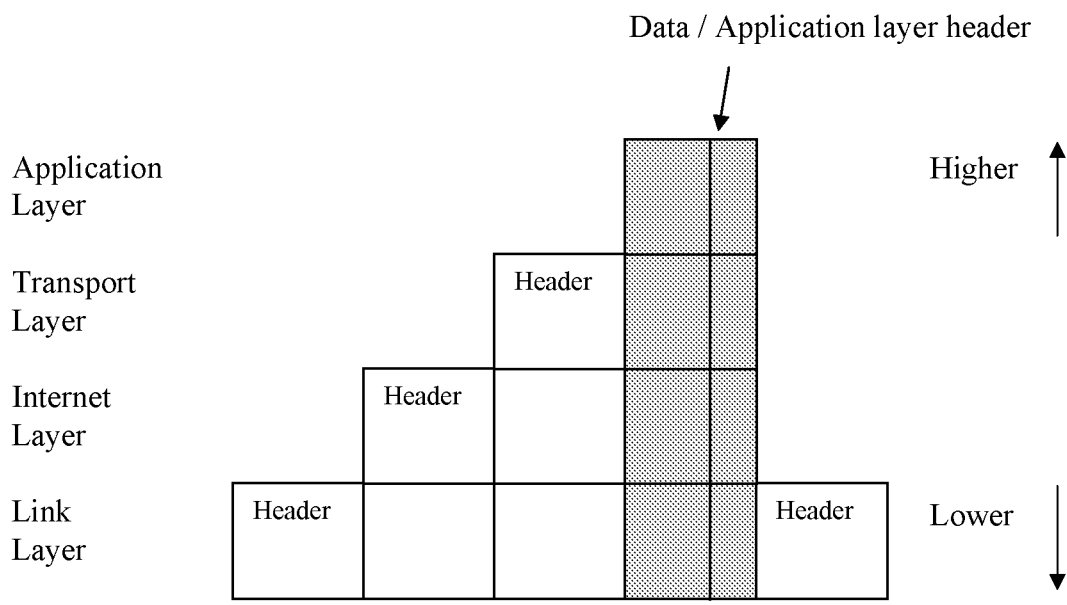
FIG. 6 (prior art) shows the network packets that are passed over a network.

FIG. 5 shows further details of processes that run within the tailorable processing mechanism 250 and in particular the media capture element 412 that can be provided by the tailorable processing mechanism 250. Reference is also made to FIG. 6 which is used to illustrate the data packets discussed in relation to FIG. 5.

As described above, the media capture element 412, in the embodiment being described, captures a media stream 219 that has been identified by the monitoring system 218 as needing further investigation. In other embodiments, the media capture element 412 may be arranged to capture other data other than streamed media.

In order to capture the media stream 219, the media capture element 412 comprises a first processing mechanism 550. The first processing mechanism functions as a media-server and receives the incoming media stream 219 and retransmits that media-stream to a second processing mechanism 552.

In the embodiment being described, the first and second processing mechanisms are provided by virtual machines providing simulated processing circuitry 104. The skilled person will appreciate that first and/or second processing mechanisms 550, 552 may be provided as physical machines. However, in the embodiment being described, providing the first and second processing as virtual machines allows flexibility as to the location of the monitoring system 218 and makes it simpler to create further tailorable processing mechanisms 250, which provide the media capture elements 412, to expand the monitoring system 218.

In the embodiment being described, the network 251 is the World Wide Web (WWW) running on top of the Internet. Other embodiments might use other architectures. However, FIG. 6 exemplifies the four layers of a WWW network, such as may be utilised for network 251. There is the link layer which is specific to the hardware providing the connection and header information of the link layer is not monitored in the embodiment being described. However, it is conceivable that in other embodiments the data packets from the link layer may be monitored and/or captured.

However, the media capture element 412, and in particular a data capture mechanism 554 thereof, is arranged to capture the header information from each of the Internet, Transport and Application layers. Thus, it will be appreciated that the data, which in the embodiment being described, is one or more packets of media data is surrounded by more header information in the lower layers. The skilled person will appreciate that in some protocols the application layer will contain header information and therefore the data block (as represented by the shaded block on the Figure), on all layers of the diagram, may in fact contain both data and application layer header information.

Data contained in the header information is useful in determining the source of a media-stream of the data and may be thought of as providing meta data associated with the media (or other data) being transmitted across the network. The skilled person will appreciate that the web-sites, or other sources of data on networks other than the WWW, may re-direct users to other sources without the user realising. Inspection of the header information can be used to determine whether this has occurred. Previously it has been a problem to understand the ultimate source of a media-stream, for example a media stream, media-file, etc, and inspection of the header information as used by the embodiment being described can be used by the take-down process 416 to send notices to the ultimate source as located by the header information, record the identity of the ultimate source, etc.

In the embodiment being described, the data capture mechanism 554 is arranged to reconstruct media-streams delivered in such a fragmented manner, such as for example by an adaptive streaming protocol. In particular, the data capture mechanism 554 is arranged to analyse the header information of at least some of the layers and to use that header information to reconstruct the data packets (which in the embodiment being described provide the media) into a non-fragmented format. Thus, in the embodiment being described, the data capture element 554 is arranged to process the header information of the various layers and to detect an HLS (or other fragmented) video stream, to capture the data, which will in this case be frames of video, from the various network packets and to stitch (ie aggregate) the data together to form a media file providing a continuous media sequence. The media file can then be processed, such as being fingerprinted, as described elsewhere.

In order to generate a reference fingerprint RFPn each of the reference fingerprint generators 202a-d processes the reference media stream 204a-d as is now described. It will be appreciated that the described technique to generate fingerprints is provided as an example and other embodiments may use other fingerprinting techniques.

The process is also exemplified in relation to FIG. 7 which represents the incoming reference media stream 204 as a sequence of frames; eg 300a, 300b, 300c, etc. Each frame of the media stream may be thought of as being a data-element. Other embodiments may process other forms of data.

A similar process is also performed within the monitoring system 218 in order to generate the sequence of candidate fingerprints CFPn and again FIG. 7 represents the candidate media stream 219 as a sequence of frames 306a-n.

In the embodiment being described, the reference fingerprint generators 202a-d are arranged as a first step to remove information from the media stream. In the embodiment being described the reference fingerprint generator is arranged to convert the frames to greyscale 402 in order to reduce the size of the data to be processed. It will be appreciated that for embodiments that are arranged to process video in real time it can be helpful to reduce the amount of data in order to increase the speed at which reference fingerprints can be generated. It has been a problem to generate fingerprints (ie reference fingerprints) for data, such as a video or video streams, which can be generated in real time and yet allow robust detection of media streams that give rise to the same, or at least similar, fingerprints (ie candidate fingerprints). It is believed that at least some embodiments described herein solve this problem.

In embodiments in which the media stream is other than video data the quality may be removed by removing one or more frequencies, removing stereo or other multi-channel information, or the like. Alternatively, or additionally, other embodiments might process channels of a media within a media-stream separately.

Next the reference fingerprint generators 202a-d are arranged to re-size the frames 300a-n in order that the frames 300a-n have uniform dimensions 404. In the embodiment being described the frames are re-sized to be 32×32 pixels thereby reducing the quality of the media stream. The reference fingerprint generators are further arranged to maintain the aspect ratio of the frames such that black bars are added to the top/bottom or edges of the frames in order to maintain the aspect ratio of the frames in the re-sized state.

In other embodiments, the media streams may be re-sized to be a size other than 32×32 pixels. It will be appreciated from the discussion that follows that embodiments that use a larger size will generate a higher number of possible fingerprints thereby reducing the chance of false positives but also that the processing involved to generate the reference fingerprints increases. Accordingly embodiments using 32×32 pixels have been found to give a good balance between a number of factors including the number of potential fingerprints, the processing required in order to process media streams in real time (or at least pseudo-real time), and the storage required to store the re-sized media stream.

In the embodiment being described a second copy of the frames 300a-n is re-sized to 16×16 pixels and used to determine an amount of movement (ie change) between consecutive frames 300a-n.

The re-sized greyscale frames are then fed into two separate buffers, which in the embodiment being described are circular, each arranged to hold portions of the data-set.

The greyscale frames resized to 32×32 pixels are fed into a first of these buffers and used to generate a fingerprint and the greyscale frames resized to 16×16 pixels are fed into a second of these and used to detect change. In the embodiment being described, each of the portions fed into the two buffers is 4 seconds in length and comprise portions of the reference media stream 204a-d. Generation of the fingerprints using the resized frames held in the first of the buffers is now described.

Once the media stream 204a-d is received then no action occurs until the buffers are filled but then reference fingerprint RFPn generation is triggered and a reference fingerprint is then generated at intervals of one half second. Other embodiments may be provided with different length buffers and/or may generate reference fingerprints at other than one half second intervals. Other embodiments may for example have buffers that are substantially any of the following lengths (in seconds): 2, 3, 5, 6, 7, 8, 10, 20, 30, 60. Further other embodiments may be arranged to generate reference fingerprints at substantially any of the following periods (in seconds): 0.1, 0.25, 1, 2, 3, 5, 10, 60.

The buffered stream of frames therefore comprises a sequence of frames each comprising X by Y pixels. Thus, a pixel at (x,y) within a frame can be located in each of the frames and this may be thought of as a tube of pixels running across the frames within the buffer. As such, the buffer contains X by Y tubes of pixels and in the embodiment being described there are 32×32 tubes; 1024 tubes.

As a first step in the reference fingerprint generation, each of the tubes of pixels is smoothed. In the embodiment being performed this is achieved with a Gaussian profile.

Next the content of the buffer is down sampled to a frame rate of 8 frames per second. As such, a four second buffer contains 32 frames of down sampled media stream. Thus, there are now 32 frames each of 32 by 32 pixels; a total of 32,768 pixels.

Thus, each of the reference fingerprint generators 202 may be thought of as containing a downsampler 134 which is arranged to process the incoming media stream or other data before that media stream is processed as described below. Such a downsampler 134 may be arranged to perform one or more of the processing steps as described above: conversion of the media stream to greyscale; re-sizing of the media stream which in the embodiment being described was to 32×32 pixels; addition of the black-bars; and downsampling of the frame rate, which in the embodiment being described was to 8 fps.

Next, the reference fingerprint generators are arranged to perform a Discrete Cosine Transformation (DCT) on the 32×32×32 cubes; ie in this embodiment a three dimensional DCT is performed (3D). It will be appreciated that embodiments that perform the DCT on equally sided cubes of pixels are advantageous in view of the optimisation that can occur in the DCT thereby reducing the amount of processing. As such, in other embodiments, should the X or Y dimensions to which the frames 300a-n are re-sized be altered then it may also be convenient to alter the number of frames to which the media stream is downsampled.

Thus, it will be appreciated the frequency components of the media stream are extracted. In the embodiment being described this extraction of the frequency component is performed by the DCT but other embodiments may use other mechanisms to achieve this. For example, other embodiments may also use a Fourier Transform, a Discrete Fourier Transform, a Cosine Transform, or the like.

The DCT provides a series of coefficients each representing a frequency component of the 4 second block of the reference media stream 204a-d that has been processed.

Because the DCT is a 3D DCT and has been performed not only in two-dimensions (XY of the frame) but in the time dimension, across the frames, the resulting reference fingerprint is termed a spatio-temporal fingerprint. In the embodiment being described the 2nd to 5th coefficients, in each of the three dimensions, are selected for further processing. In other embodiments a different set of coefficients may be selected however, embodiments using the 2nd to 5th coefficients are felt to be advantageous as these coefficients tend to capture the greatest change within the frames of the reference media stream 204a-d thereby providing for robust identification of candidate media-streams against the reference media-streams 204a-d. These extracted frequency components, in the embodiment being described, provide the basis of the fingerprint that is generated.

Next the reference fingerprint generators are arranged to quantise the selected coefficients (in this embodiment this is the 2nd to 5th coefficients) about the median value of the selected coefficients. Thus, there are 4×4×4 coefficients each of which is stored as a one bit number. Such quantisation results in an equal number of ones and zeros and in the embodiment being described it is arranged to generate 32 ones and 32 zeroes. The fingerprints are schematically shown at 304 in FIG. 7.

Thus, a reference fingerprint 304 is generated according to the content of one of the two buffers. The other buffer is used to detect motion within the 4 second portion of media stream. In the embodiment being described, this downsampling is performed on the full frame rate of the input media-stream but in other embodiments this might be performed on the downsampled frames.

Thus, the reference fingerprint generator 202a-d may be thought of as comprising a fingerprint generator 130 which is arranged to perform the steps outlined. Similarly, the monitoring system 218 may also be thought of as comprising a fingerprint generator 130. These fingerprint generators 130 are arranged to generate a sequence of fingerprints from a portion of either the candidate or reference media-streams; ie the respective media streams in the embodiment being described.

A quality measure is then generated, which in the embodiment being described may be performed by the quality assessor 132. As a first step, a change in a property between at least some of the frames is determined. In the embodiment being described, the change in property is the difference in intensity between pixels in neighbouring frames (ie the difference in intensity between pixel (x1, y1) in neighbouring frames is calculated) to generate an inter-frame intensity change. In the embodiment being described, this change in intensity between neighbouring pixels is summed across of all of the pixels of the frames for each inter-frame period. In other embodiments a sub-set of the pixels may be summed.

Thus, an array of 31 numbers is generated, with a number for each inter-frame period, there being 32 frames used to generate each quality measure.

Next, the array is sorted in order of magnitude thereby creating an ordered array ranging at one end with the highest value at one end of the array to the lowest value at the other end of the array.

Next the reference fingerprint generator 202 or monitoring system 218 is arranged to calculate a predetermined percentile of the array. In the embodiment being described this predetermined percentile is the 95th percentile of the array. Subsequently value given by the predetermined percentile is normalised by the number of pixels. This provides a quality measure giving an indication of the amount of inter frame motion which is used during fingerprint comparisons made by the system 200.

Lastly, the reference fingerprint generators 202a-d are arranged to pack the fingerprints generated together with the quality measures and uploaded to the store 210. Thus, the quality measures are stored in association with the fingerprints. Some embodiments may store the fingerprints and quality measures separately in a manner which they are linked or otherwise associated with one another.

In the embodiment being described, sequences of reference fingerprints RFPns are uploaded in minute intervals and as such 57 fingerprints are uploaded at a time, there being no fingerprints generated for the first 3 seconds of the media stream 204a-d until the buffer becomes full. There is associated with each of the reference fingerprints RFPn a timestamp and the quality measure derived for that fingerprint.

Uploading to the store 210 in minute long batches is felt to provide a balance between quickly getting fingerprints into the store 210 and reducing the network overhead associated with transmitting small amounts of information. As such, other embodiments may be arranged to upload fingerprints to the store 210 at different intervals. For example, other embodiments might be arranged to upload fingerprints individually; or at substantially any of the following time periods: 10 seconds; 30 seconds; 45 seconds; 90 seconds; 2 minutes; 5 minutes; or more.

It should be noted that, in the embodiment being described, although each fingerprint represents 4 seconds of the media stream 204a, a fingerprint is generated by the method every second. Thus, the generation of the reference fingerprints 300a-n may be thought of as there being a window 305 moved through the frames of the media stream 204a (ie to move through the reference or candidate media-streams) to have a plurality of positions relative to the media-stream. A fingerprint is then generated for predetermined positions of the window 305. Thus, in the embodiment described the buffer of each of the reference fingerprint generator 202 and the monitoring system 218 provides window generators arranged to select respectively a portion of the reference media-stream and candidate the media streams and generate respectively a reference or candidate fingerprint from the portion of the dataset covered by the window.

Thus, window positions generated at consecutive time periods may be thought of as neighbouring window positions. Thus, it can be seen that the window positions 305a at a first time period which generated RFP1 is a neighbouring window position to window position 305b used to generate fingerprint RFP2.

Thus, in the embodiment being described information from any one of the downsampled frames is contained in several fingerprints (eg 4 in the embodiment being described). This can be seen in FIG. 7 where it can be seen that Reference Fingerprint 1 ($RFP_1$) contains information relating to frames 300a, 300b and 300c. The second Reference Fingerprint ($RFP_2$) is started from frame 300c. The skilled person will appreciate that FIG. 7 is a simplification and that the number of frames has been reduced in order to increase the legibility of the Figure and that in the embodiment being described, a fingerprint (eg $RFP_1$) is generated from 32 frames (after the down sampling) has been performed.

In the embodiment being described, the store 210 contains two databases: a first database containing reference fingerprints RFPn for reference media streams 204a-d which are currently live and a second database holding reference fingerprints RFPn for non-live media streams. Other embodiments may provide different arrangements of data with the store 210 but it is believed advantageous to provide a database for the fingerprints associated with live reference media streams 204a-d (ie media that is currently being delivered to users, perhaps via streaming) to ensure that the database is reduced in size thereby increasing the speed of access for media streams that are currently being transmitted (ie live media streams).

In the embodiment being described, the or each database held on the store 210 (in this embodiment two databases) are then replicated out to the identification processing mechanisms 216a-d such that each of the identification processing mechanisms maintains a copy of the, or each, database of reference fingerprints RFPn. Such embodiments are believed advantageous since it is highly scalable and the size of the system can be increased by adding further identification processing mechanisms 216a-d.

In the embodiment being described the store 210 and identification processing mechanisms 216a-d are hosted using a LINUX system and the LINUX shell command rsync is used to replicate the, or each, database out to the identification processing mechanisms.

Typically therefore, once a reference fingerprint 304 (RFPn) has been generated by one of the reference fingerprint generator 202a-d it is uploaded to the store 210 within on the order of seconds after the minute interval upload cycle has elapsed. Moreover, embodiments that use the rsync command are believed advantageous as they replicate only changes in the, or each, database on the store 210 out to the identification processing mechanisms 216a-d thereby increasing the speed and efficiency at which the upload is performed.

In addition to the generation of reference fingerprints from the reference media streams 204a-d the store may be arranged, in some embodiments, to receive reference fingerprints from other sources 222. Such reference fingerprints may subsequently be included in the analysis process described below to determine whether candidate media-streams corresponds to reference media streams that are being monitored by the system 200; media or other data that has a reference fingerprint stored within the store 210 may be thought of as being media (or other data) monitored by the system.

Reference fingerprints RFPn uploaded to the store 210 from the external source 222 may be representative of any type of media-stream that that embodiment is capable of monitoring otherwise identifying candidate media against.

The monitoring system 218 is arranged to monitor one or more sources of candidate media streams 219. These sources may typically be web sites and the monitoring system may typically be arranged to monitor a plurality of such sources at any one time.

Conveniently, some embodiments are arranged to process portions of the candidate media stream of a predetermined length. In particular, embodiments may be arranged to generate fingerprints for substantially one minute long portions of a candidate media stream. It will be appreciated that should the media stream relate to something like a football match then it will be significantly longer than this. However, it will be appreciated that should the embodiment be arranged to monitor and try to prevent transmission of unauthorised media streams then it is desirable to detect transmission of that media stream as soon as possible and as such is not desirable to wait until the transmission of the media stream has finished before generating fingerprints and as such it is advantageous to process the candidate media streams in portions in the same way that it is advantageous to generate fingerprints for portions of the reference media streams. However, it is also not desirable to generate too much network traffic by sending excessive amounts of fingerprints and it is felt that providing embodiments that process portions of the candidate media stream in portions of substantially 60 seconds provides a balance. Again, other embodiments may use a time period of other than 60 seconds.

In use, the monitoring system 218 is arranged to generate, using the same method as described in relation to FIG. 7, a sequence of candidate fingerprints CFPn for the or each candidate media stream 219. That is, the same method is used to generate the candidate fingerprint CFPn as is used to generate the reference fingerprint. Thus, one or more candidate fingerprints CFPn are generated which are the same, or at least similar, to one or more reference fingerprints RFPn, as long as the underlying candidate media stream from which the candidate fingerprints CFPn are generated is the same, or at least similar to, a reference media stream that generated the reference fingerprint RFPn. Thus, embodiments of the system 200 might find application in determining whether candidate media streams correspond to the live reference media streams 204a-d which in itself is useful in determining and trying to stop the occurrence of on-line piracy and detecting copies of reference media streams 204 monitored by the system.

Other embodiments might find other applications. For example, the store 210 may provide a library in which candidate fingerprints CFPn generated from a candidate media-stream may be identified against the reference fingerprints RFPn held within the store 210. Such embodiments would thus allow a media-stream (such as video file; a picture, an audio file or the like) to be checked against the store 210 in an attempt to identify that candidate media-stream as a match to the media-streams referenced in the store 210.

The generation of the candidate fingerprints is again represented schematically in FIG. 7 which shows an incoming candidate media stream 219 represented as a sequence of frames 306a, 306b, 306c, 306d to 306n. As is the case with the generation of the reference fingerprints, a moving window 308 is moved along the media stream 219 and a Candidate Fingerprint $CFP_1$-$CFP_n$ is generated for predetermined positions of the window 308. As with the reference fingerprint generation, in the embodiment being described, a fingerprint is generated substantially every half second although each fingerprint covers 4 seconds of frames 306a-n. As described above a circular buffer provides a window generator arranged to provide the window to receive and process a portion of the media-stream.

As with the generation of the reference fingerprints candidate fingerprints are grouped together before being uploaded to the queue 220. Again, the candidate fingerprints, a timestamp and the associated quality measure are uploaded in groups of 57 candidate fingerprints representing the one minute length of candidate media stream 219 that has been processed.

As described above, the system generates a queue 220 of sequences of candidate fingerprints CFPn to be compared with reference fingerprints RFPn within the store 210. In addition to the candidate fingerprints CFPn generated by the monitoring system 218 candidate fingerprints can be added, in at least some embodiments, to the queue 220 from an external source 224 capable of generating candidate fingerprints CFPn.

Queued sequences of candidate fingerprints are then accessed and removed from the queue 220 by one of the identification processing mechanisms 216a-d and that identification processing mechanism then searches the reference fingerprints held within the store 210 for the occurrence of a reference fingerprint RFPn corresponding to that of one or more candidate fingerprint CFPn from the sequence of candidate fingerprints CFPn. This search of candidate fingerprints CFPn tries to locate matching reference fingerprints RFPn within the store 210 thereby identifying the media stream that generated the candidate fingerprint CFPn as being the same as the media stream that generated the reference fingerprint RFPn.

Each of the identification processing mechanisms 216a-d maintains a complete copy of the, or each, database from the store 210. In the embodiment being described, this copy is maintained within the Random Access Memory (RAM) of the identification processing mechanism 216a-d. Embodiments with such an arrangement are advantageous due to the speed of processing that this allows. However, other embodiments may hold the copy of the, or each, database within any form of storage that the processing circuitry of the identification processing mechanism 216a-d can access, whether networked to or local to the processing circuitry.

The copy of the, or each, database within the identification processing mechanism 216a-d is from time to time forced to update itself to reflect any changes within the database(s) on the store 210. Updating may for example be forced to occur substantially on the order of minutes, perhaps substantially on the order of any of the following 30 seconds; every minute; every 5 minutes; every 10 minutes; any time in between these times.

Once the identification processing mechanism 216a-d has obtained a sequence of candidate fingerprints CFPn from the queue 220 it searches at least some, and typically each, of the databases to which it has access to determine whether candidate fingerprints CFPn from the queue match any of the reference fingerprints RFPn that are held within the databases that are searched. Although fingerprints are uploaded to the queue 220 in groups relating to portions of candidate media stream (such as a one minute long portion) each of the 64-bit fingerprints relating to 4 seconds of the candidate media stream is searched against the or each database.

In order to increase the security of a match, and to reduce the chances of a false positive and/or a false negative, fingerprints can be aggregated as described hereinafter.

Thus each of the identification processing mechanisms 216a-d is arranged to make a comparison of a candidate fingerprint obtained from a sequence of fingerprints from the queue 220 against all of the reference fingerprints RFPn of which the system is aware. Such comparison is typically carried out by the comparator 128 and used to locate reference fingerprints RFPn which match at least one of the candidate fingerprints CFPn.

The identification processing mechanism 216a-d is thus arranged to compare each individual fingerprint (eg each 64 bit number in the embodiment being described) in the candidate fingerprint CFPn that it is processing with each of the reference fingerprints RFPn within the store 210. The identification processing mechanism 216a-d is further arranged to accumulate pairs of candidate and reference fingerprints that match where a match is determined if:
1. The Hamming distance between candidate and reference fingerprints is below, or equal to, a predetermined threshold, which is the embodiment being described is 14; and
2. The quality measure of both candidate and reference fingerprints is above, or equal to, a predetermined threshold, which in the embodiment being described is 3.0.

This matching between the candidate and reference fingerprints (RFPn) is exemplified in FIG. 8a in which a sequence of reference fingerprints generated from a reference media stream 204a is shown above a sequence of candidate fingerprints (CFPn) generated from a candidate media stream 219.

Thus, taking fingerprint CFP1 from within the sequence as an example, then CFP1 is searched against all of the reference fingerprints stored in the store 210. The arrows between the reference fingerprints RFPn and candidate fingerprints CFPn represent fingerprints that are deemed to match according to the above criteria. Thus, in the example being given, it can be seen that CFP1 is found to be a match against RFP2; RFP4 and RFP5.

It is recalled that in the embodiment being described the media streams 204a and 219 are video streams and as such, it is likely that neighbouring frames within the video streams do not change significantly. This low amount of change between frames is particularly the case for periods in which there is low movement in the video stream. Similar effects are likely to be seen in streams of other types of data.

The similarity between frames can result in multiple matches of fingerprint within a stream. Also, media streams having a similar content may also result in matches in the fingerprints representative of those streams. In one example, a similar sequence of camera movements (eg panning and zooming and change of shot) within two different football matches (or other content) may generate similar sequences of fingerprints. There may be co-incidental matches with fingerprints in other streams.

It will also be appreciated that embodiments may not have temporal alignment between the fingerprints generated from the candidate and reference streams. Indeed, it is perhaps likely that the temporal relationship between a candidate media stream 219 against a reference stream 204a will not be known. Thus, looking at CFP3, it can be seen, in this example, that it has been matched against RFP1, RFP6 and RFPn. It will be noted that RFP1 is before any of the reference Fingerprints (RFPn) against which CFP1 has been matched thereby making it less clear how the candidate fingerprints (CFPn) are temporally aligned with the reference fingerprints (RFPn), assuming that the fingerprints represented in the FIGS. 8a and 8b do in fact represent the same media stream.

FIG. 8a is likely to be a simplification as to both the number of matches between the candidate fingerprints CFP1 and the reference fingerprints RFP1 and also the dispersed nature since, as discussed above they may well be matches to other media streams.

Some embodiments may be arranged to add a time stamp to each fingerprint that is generated. Further, such embodiments may be arranged to constrain the reference fingerprints against which the candidate fingerprints are compared to those that occurred within a predetermined time of the candidate fingerprint. Such embodiments may enable more rapid searching of the reference fingerprints and may also be useful when the media-stream represents an Internet media stream of an event where copied streams are likely to occur within a short time period of the original media stream.

It is conceivable that matches between candidate (CFPn) and reference (RFPn) fingerprints may be false positives. It is also conceivable that a 4 second segment of candidate media stream 219 that should have produced a match (ie matches a reference media stream) did not result in a match (ie a false negative). As discussed above, if the data relates to a media stream, such as a video, then it is likely that neighbouring frames of the media stream (eg 300*a-d*) are similar to one another and therefore, fingerprints, whether candidate or reference, which are generated from similar time regions of the media stream are likely to be similar to one another.

Accordingly, each of the identification processing mechanisms is further arranged to aggregate a number of matches as is now described with reference to both FIGS. 8*a* and 8*b*. As a starting point and as described in relation to FIG. 8*a*, the store 210 is searched to locate each reference fingerprint RFPn that matches a given candidate fingerprint CFPn. An aggregation process is then performed to provide a more robust identification of a candidate media stream 219 against a reference media stream 204*a* for which candidate fingerprints RFPn are held within the store 210. As described above, a match between a single reference fingerprint RFPn and candidate fingerprints CFPn does not necessarily identify a match between a candidate media stream 219 and a reference media stream 204*a*.

As described in relation to FIG. 8*a* it is likely that there are at least some false matches against any one candidate fingerprint CFPn that is being processed. Accordingly, embodiments that implement the aggregation process are believed advantageous since they increase the robustness of the identification of the candidate media stream 219 within the reference media streams 204*a* which have generated the reference fingerprints within the store 210.

Thus, the aggregation process identifies regions 702 of the candidate fingerprints CFPn generated from the candidate media stream 219 which map to regions of fingerprints RFPn generated from the reference media stream 204*a* and use the temporal relationship to increase the belief that a match between a candidate fingerprint CFPn and a reference fingerprint RFPn exists.

Thus, looking at FIG. 8*a* it can be seen that matches exist between the following fingerprints within the sequence of fingerprints shown in the Figure:

CFP2 and RFP5;
CFP3 and RFP6;
CFP4 and RFP7; and
CFP6 and RFPn.

It should also be noted that, in the example given, CFP5 was not found to match reference fingerprint RFP8.

FIG. 8*b* shows how the aggregation process determines that a match has occurred between the candidate media stream 219 and the reference media stream 204*a*.

The aggregation process looks for any region of candidate fingerprints CFPn within the sequence that has multiple matches and any such region that passes the aggregation process is reported as a positive match. In one embodiment this may mean that the candidate media stream 219 matches a reference media stream 204*a-d* being monitored by the system 200. In other embodiments this may mean that a candidate media-stream has been identified against reference fingerprints representing a reference media-stream which are held within the store 210. As described above a positive match is reported if a minimum number of candidate fingerprints in a sequence is held to match fingerprints with the sequence of reference fingerprints.

In the context of the preceding paragraph a region of fingerprints may comprise any number of consecutive fingerprints and may for example comprise substantially 2, 3, 4, 5, 6, 7, 8, 9, 10, 15, 20, 25, 30 or more consecutive fingerprints.

A sequence of candidate fingerprints is said to be an overall, aggregated, match of a sequence of reference fingerprints if, for the same number of reference and candidate fingerprints (ie the same time period):
1. The sequence is at least M fingerprints long, where M in the embodiment being described is set to 6;
2. The sequence starts with a positive candidate/reference fingerprint match;
3. There is no gap between positive candidate/reference matches longer than D, wherein the current embodiment D is set to 3. This test ensures that there are fewer than a predetermined number of gaps within the sequence of fingerprints. In the embodiment being described, this equates to it being permissible to have non-matches between candidate and reference fingerprints of up to 3 seconds whereas a period of 4 seconds would result in a failure to meet the aggregation test.

Putting this in to context with FIG. 8*b*, it is seen that CFP2 is the start of block 704 of matches (identified by the tick in CFP2) which maps to RFP5. The block 704 contains 9 candidate fingerprints (CFP2 to CFP10) which include 7 matches (CFP2; CFP3; CFP4; CFP6; CFP8; CFP9; and CFP10) and two misses (CFP5 and CFP7), ie gaps between neighbouring matches. Accordingly this block 704 meets the criteria that has been set and match between candidate media stream 219 and reference media stream 204*a* is deemed to have occurred since the points 1 to 3 above have been met. It will be noted that for reasons of clarity only some of the links between the candidate fingerprints (CFP10) and the reference fingerprints FRPn are shown.

Thus, in the embodiment being described, the block 704 meets the criteria and a match between that block of candidate media stream 219 and reference media stream 204*a* is deemed to have occurred.

In order to try to prevent the system from being circumvented by simple manipulations of the candidate media stream, the media stream is mirrored both horizontally and vertically and each orientation is passed through the fingerprinting process. Thus, in the embodiment being described each candidate media stream passes through the fingerprinting process 4 times: un-mirrored; vertically mirrored; horizontally mirrored; and both horizontally and vertically mirrored.

In other embodiments the candidate media-streams may undergo other processing in order to try to prevent the defeat of the system.

The identification processing mechanisms 216*a-d* are then arranged to report each region that passes the aggregation process as a positive match between a region of candidate media stream and reference media stream.

Thus, the fingerprint detection process 1006 as described in relation to the above figure identifies candidate media-streams that are judged to match reference media-streams. Such identified candidate media-streams may be thought of as matched media streams.

The following process is performed on matched media-streams in order to determine whether that stream carries markers. Here it will be appreciated that the monitoring system described above can be used to monitor both marked and non-marked media-streams.

The output of the above process provides what may be thought of as coarse temporal synchronisation between the reference media stream and the candidate media stream. Here temporal synchronisation may be thought of as identifying how remote a portion of the candidate media stream is from the beginning of the, original, reference media stream. The portion reference here might be a frame of a video stream or other portion. Such temporal alignment is useful in embodiments which are detecting markers as it will be appreciated that markers may only appear on a subset of frames, and that markers may differ between frames. Thus, to identify the identity code provided by the markers, the system identifies at least the start and end points of the matched media streams. In alternative or additional markers, points within streams may also be identified, for example advertisement breaks, scene changes or the like. Advantageously, identification of points within streams may aid temporal alignment when the start and/or end of a media stream has been cropped. The ORB features that were recorded by the fingerprinting process may also be used for temporal alignment (re-synchronisation). The skilled person would understand that the use of fingerprint matching coupled with feature extraction can be used to re-synchronise (in time terms) a captured candidate media stream with the corresponding media stream as processed by the fingerprint generator 202. A time period/window during the candidate media stream during which it is known that the markers 111 would have been displayed on the screen can therefore be identified. Advantageously, accurate identification of the window ensures that only the smallest possible amount of the media stream is processed for marker, and hence user ID or the like, extraction.

The temporal alignment of the matched media-stream 900 against a reference media-stream 204 is shown in FIGS. 9a and 9b. FIG. 9a shows a matched media-stream 900 which is temporally aligned with the reference media stream 204. Frames containing markers 111 are represented by black frames, such as 902a, 902b. Unmarked frames, ie frames containing no markers, are represented by white frames, such as 904a, 904b.

It will be appreciated that the candidate media-stream 900 may not have the same total number of frames as the original, reference, media-stream 204. For example, the candidate media-stream 900 may be a cropped version of the media content, and/or may have a different frame rate, due to any copying, modification, etc. of the delivered media-stream 119. However, the marked frames will likely retain the approximate timing with respect to the marked media-stream. Thus, in the embodiment being described, temporal alignment can be used to identify one or more regions within a candidate media-stream 900 within which marked frames would be expected to be found.

The skilled person will appreciate that each of the one or more regions within a candidate media-stream 900 within which marked frames would be expected to be found may correspond to a single frame, or to a plurality of frames. Frames within the identified regions can then be analysed for markers. Advantageously, the regions are sized to be as short as possible whilst ensuring that marked frames are contained within the regions. Ideally, the regions comprise only marked frames. The skilled person would understand that, the shorter the identified regions, the fewer frames need to be analysed. If the regions are too short, however, markers may be missed.

FIG. 9b shows a matched media-stream 906 which is not temporally aligned with its associated reference media-stream 204. As discussed above, temporal alignment means that the system has not identified portions of the matched media-stream relative a point, typically the beginning, of the reference media stream 204. As such, it can be seen that frame 902b is not aligned with frame 902a and frame 904a is not aligned with frame 904b. Thus, in the example of FIG. 9b, extraction of the identity code may fail since the system has incorrectly temporally aligned the candidate media stream and the reference media stream 204.

In summary, in the embodiment being described, the markers are only placed in a subset of frames, the system identifies when that subset of frames will occur to increase the robustness of the detection of the markers.

In the case of a video media-stream, the output of the above fingerprinting process will also identify whether the matched media stream has been flipped horizontally and/or vertically. Embodiments may process the matched media stream to reverse any such detected flipping before detecting the markers within the matched media-stream.

Some embodiments may be arranged to determine if portions of the marked stream 108 were deleted. For example, it is known that a top portion of a video may be deleted in order remove channel information, or other such information, from the video media content. Should any portion of the video be removed, then there is a possibility that the relative or absolute position of at least portions of the markers 111 may be altered.

As such, some embodiments may be arranged to identify whether portions of the media content delivered within the marked media stream 108 have been deleted. Should such a determination be made that embodiment may be arranged to replace the removed portion (perhaps with a block of uniform colour, or the like) or otherwise reposition the media content such that the position of the markers is corrected. In the embodiment being described, the ORB features that were recorded by the fingerprinting process may facilitate the identification as to whether portions of the media content have been deleted. Thus, the embodiment being described is advantageous as it can often still recover markers 111 even when the video media content has been manipulated (such as through cropping, padding, rotating, or the like).

It is conceivable that the temporal alignment of the matched media stream from the fingerprinting process is not sufficient. As such, at least some embodiments, including the one being described perform further alignment. In particular, it will be appreciated that the rate of change in some media streams may be quite low and such media-streams, especially, may need a more precise alignment. It will be appreciated that the more precisely the start and end points of regions within a matched media stream within which marked frames are expected to be found can be aligned with the reference media-stream then the more likely it is that the identity code extraction process described below will give the correct outcome.

The embodiment being described extracts feature descriptors from the matched media-stream of the same format at the original reference media-stream 204 (ORB feature descriptors). A video registration is then performed between the extracted features from the matched media-stream and the reference media-stream 204 to which a match has been found. The video registration identifies finer time synchronisation between the matched media stream 900 and the reference media stream as well as any geometric transformation (eg rotation; scaling; and/or translation) between the matched media-stream 900 and the reference media stream 204. The matched media-stream 900 is transformed to reverse any such transformation, so that it has the same geometry as the original reference media stream 204.

Next, the process identifies frames (eg 902a, 902b) within each of the identified regions and processes each of those frames to extract any markers that are within each frame.

In the embodiment being described there are many possible markers and arrangements of markers which could have been applied to any given frame, dependent on the user information from which the markers are determined.

In embodiments wherein the identity code is embedded within a single frame, there may be multiple frames within the media stream which are marked. In at least some such embodiments, the process assigns a confidence level to the code determined from each frame being processed that contains the marker(s), and selects the code to which the highest confidence is assigned, and/or the code which has been extracted most often, if different codes have been extracted.

In embodiments wherein the identity code is embedded across a plurality of frames, the markers may be repeated in different regions within the media stream. In at least some such embodiments, the process assigns a confidence level to the code determined from each set of frames being processed that contains the marker(s), and selects the code to which the highest confidence is assigned, and/or the code which has been extracted most often, if different codes have been extracted.

Since the markers 111 are embedded in the delivered media stream 119 in a known manner, the detection of those markers 111 is facilitated using knowledge as to where to expect the position of the markers 111. Once the markers 111 have been detected, the process that generated the position of the markers 111 is run in reverse to obtain the User ID.

Thus, the identity code that has been encoded into the delivered media stream, from which the matched stream has been derived, is determined 1008. It will be appreciated from above the identity code is encoded into, in this embodiment, a plurality of frames. As such, the embodiment collates the markers from the plurality of frames. The timing information that the system has stored is used to help to ensure that start and end points of the regions within the media stream within which marked frames are expected are correctly identified.

It is conceivable that the extracted identity code be compared to valid identity codes (ie User ID's) that have been assigned to users 120-124, which brings with it the advantage of increased robustness in the detection. However, in the embodiment being described, no checks as to whether the User ID is valid are made. Some embodiments may implement check bits, etc. in order to correct errors and make the system more robust.

Some embodiments, may be arranged to continuously extract identity codes from a candidate media-stream, or at least make multiple extractions of the identity code from a candidate media stream, and subsequently to average or otherwise combine the identity codes. Such embodiments can help to increase the belief in the identity code that is extracted from the matched media stream.

Once a valid identity code has been extracted from a matched media stream then identity of the user to which the delivered media stream 119*a-c* was sent is determined, typically by accessing a database of users which contains the identity code assigned to each of them.

The process of determining the identity of a user (eg user 120) from a matched media stream is performed in real time such that it is possible to terminate the media-stream whilst the delivered media stream is being broadcast, streamed, or the like. In the embodiment being described, it will be appreciated that the fingerprinting identification process performed on the candidate media stream 219 takes on the order of 1 minute Detection of the markers 111 within the candidate media stream will also take processing time and as such, here real time may mean on the order of roughly a few minutes. For example, 1 min, 2 min, 3 min, 4 min, 5 min, perhaps up to 10 minutes.

As described above, an identity code is encoded into the delivered streams via markers to provide a, typically, unique identification of a user to whom the content was delivered. The skilled person will appreciate that the number of markers, and/or the number of frames, used to encode information into the delivered media streams 119*a-c* may be varied between embodiments.

In some embodiments the check bits may provide an error correcting code. For example, the check bits may allow any one of the following codes: a Hamming Code; a Reed-Solomon code; a Low Density Parity Check; or the like. The skilled person will appreciate use of such codes will increase the robustness, for embodiments that use the code, with which the identity code can be extracted from the matched media stream.

The invention claimed is:

1. A method of securing and/or tracing video media-content which comprises a plurality of frames, the method comprising:
   arranging a media-delivery platform to have a plurality of target devices connected thereto and further arranging the media-delivery platform to deliver the video media-content to a user ID being used at one of the target devices;
   recording a reference fingerprint representing the video media-content;
   receiving the video-media content at the target device;
   generating, at each target device, a unique identifier based on the user ID being used at the device to which media content is being delivered, wherein;
   i) the unique identifier is provided as one or more opaque, or at least semi-transparent visual markers to be overlaid at positions relative to at least one frame of the video media content, where the positions are calculated based on the user ID; and
   ii) the visual markers are to be overlaid on at least one frame of the video media content such that the visual markers occur at a predetermined time relative to the video media-content;
   overlaying the opaque, or at least semi-transparent, visual markers on the video-media content and causing the combined video-media content and visual markers to be displayed;
   monitoring a network to detect video media-content having a fingerprint which is the same, or at least substantially the same, as the reference fingerprint where each so detected video media-content provides a candidate media-content from which the unique identifier is to be extracted; and
   extracting the unique identifier from within the or each candidate video media-content to identify the user ID being used at the target device to which the video media-content was delivered.

2. The method of claim 1 wherein the candidate media-content is temporally aligned, with the reference media content to allow the frames on which the visual markers have been placed to be identified, wherein the alignment is performed using the reference fingerprint and the fingerprint obtained from the candidate media-content.

3. The method of claim 1 in which the unique identifier is calculated based upon a variable in addition to the user ID, wherein the variable varies in a known manner.

4. The method of claim 3 in which the variable is time.

5. A method of securing video media-content which comprises a plurality of frames, the method comprising:
receiving, at a target device, video media-content from a media-delivery platform; and
generating, at the target device, a unique identifier based on a user ID being used at that target device, wherein the unique identifier is provided as one or more opaque, or at least semi-transparent visual markers to be overlaid at positions relative to at least one frame of the video media content, where the positions are calculated based on the user ID;
the visual markers are overlaid on at least one frame of the video media content such that the visual markers occur at a predetermined time relative to the video media-content; and
overlaying the opaque, or at least semi-transparent, visual markers on the video-media content and causing the combined video-media content and visual markers to be displayed.

6. The method of claim 5 wherein the target device is a set-top box arranged to display video media content.

7. The method of claim 6 wherein the set-top box is arranged to receive and cause to be displayed broadcast media content.

8. The method of claim 6 wherein the set-top box is arranged to superimpose the unique identifier onto the video media content.

9. The method of claim 6 wherein the set top box is arranged to output a marked stream, for display, comprising both the media content and superimposed unique identifier.

10. The method of any of claim 6 in which the set top box is caused to download an application arranged to add the unique identifier.

11. The method of claim 10 in which the application is arranged to add the unique identifier at predetermined times.

12. A method of securing and/or tracing video media-content which comprises a plurality of frames, according to claim 5, the method comprising:
receiving at least one candidate media-content which has been determined to have a fingerprint substantially the same as a reference fingerprint generated for the video media-content;
processing, the candidate media-content to temporally align the reference fingerprint with the reference video media-content used to generate the reference to allow the frames on which a visual maker has been placed to be identified, wherein the alignment is performed using the reference fingerprint and the fingerprint obtained from the candidate media-content; and
extracting the unique identifier from the identified frames within the or each candidate video media-content to identify the user ID held within the unique identifier.

13. A non-transitory machine readable storage medium containing instructions which when read by a machine, cause a processor of that machine to perform the following steps:
receive, at a target device, video media-content from a media-delivery platform;
generate, at the target device, a unique identifier based on a user ID being used at that target device, wherein the unique identifier is provided as one or more opaque, or at least semi-transparent visual markers to be overlaid at positions relative to at least one frame of the video media content, where the positions are calculated based on the user ID;
the visual markers are overlaid on at least one frame of the video media content such that the visual markers occur at a predetermined time relative to the video media-content; and
overlay the opaque, or at least semi-transparent, visual markers on the video-media content and causing the combined video-media content and visual markers to be displayed.

14. A non-transitory machine readable storage medium containing instructions which when read by a machine, cause a processor of that machine to perform as a server to provide the following steps:
deliver video media-content to a user ID being used at a target device connected to the server;
record a reference fingerprint representing the video media-content;
wherein the target devices are arranged to:
a) generate, a unique identifier based on the user ID being used at the device to which media content is being delivered, wherein;
i) the unique identifier is provided as one or more opaque, or at least semi-transparent visual markers to be overlaid at positions relative to at least one frame of the video media content, where the positions are calculated based on the user ID; and
ii) the visual markers are to be overlaid on at least one frame of the video media content such that the visual markers occur at a predetermined time relative to the video media-content; and
b) overlay the opaque, or at least semi-transparent, visual markers on the video-media content and causing the combined video-media content and visual markers to be displayed;
monitor a network to detect video media-content having a fingerprint which is the same, or at least substantially the same, as the reference fingerprint where each so detected video media-content provides a candidate media-content from which the unique identifier is to be extracted; and
extract the unique identifier from within the or each candidate video media-content to identify the user ID being used at the target device to which the video media-content was delivered.

15. A system arranged to secure and/or trace video media-content which comprises a plurality of frames, the system comprising:
a media-delivery platform arranged to:
i) have a plurality of target devices connected thereto;
ii) deliver the video media-content to a user ID being used at one of the target devices; and
iii) record a reference fingerprint representing the video media-content that is delivered to the or each target device;
wherein the or each target device is arranged to generate a unique identifier based on a user ID being used at the device to which media content is being delivered, wherein;
i) the unique identifier is provided as one or more opaque, or at least semi-transparent visual markers to be overlaid at positions relative to at least one frame of the video media content, where the positions are calculated based on the user ID; and
ii) the visual markers are to be overlaid on at least one frame of the video media content such that the visual markers occur at a predetermined time relative to the video media-content;

and wherein the system is arranged to monitor a network to detect video media-content having a fingerprint which is the same, or at least substantially the same, as the reference fingerprint where each so detected video media-content provides a candidate media-content to be decoded;

the system being arranged to process the candidate media-content after comparison with the video media-content used to generate the reference fingerprint to temporally align the candidate media-content to identify which frames contain the unique identifier; and wherein the system is further arranged to extract the unique identifier from the identified frames within the or each candidate video media-content to identify the user ID being used at the target device to which the video media-content was delivered.

16. The system of claim 15 wherein the system further comprises a target device arranged to:

receive video media-content from a media-delivery platform;

generate a unique identifier based on a user ID being used at that target device, wherein the unique identifier comprises one or more visual markers distributed across at least one frame of the video media-content at positions which are calculable based on the user ID; and cause the at least one frame of video content having the unique identifier to be displayed at calculable times when the video media-content is displayed.

17. The system of claim 16 wherein the target device comprises a set-top box.

18. The system of claim 17 wherein the set-top box is arranged to receive and cause to be displayed broadcast media content.

19. The system of claim 17 wherein the set-top box is arranged to superimpose the unique identifier onto the video media content.

20. The system of claim 19 wherein the set-top box is arranged to output a marked stream, for display, comprising both the media content and superimposed unique identifier.

* * * * *